US009689666B2

(12) United States Patent
Yao et al.

(10) Patent No.: US 9,689,666 B2
(45) Date of Patent: Jun. 27, 2017

(54) 1-DIMENSIONAL AND 2-DIMENSIONAL DISTRIBUTED FIBER-OPTIC STRAIN AND STRESS SENSORS BASED ON POLARIZATION MAINTAINING FIBER USING DISTRIBUTED POLARIZATION CROSSTALK ANALYZER AS AN INTERROGATOR

(71) Applicant: General Photonics Corporation, Chino, CA (US)

(72) Inventors: Xiaotian Steve Yao, Diamond Bar, CA (US); Yao Yao, Chino, CA (US); Xiaojun Chen, San Gabriel, CA (US)

(73) Assignee: General Photonics Corporation, Chino, CA (US)

( * ) Notice: Subject to any disclaimer, the term of this patent is extended or adjusted under 35 U.S.C. 154(b) by 0 days.

(21) Appl. No.: 14/640,012

(22) Filed: Mar. 5, 2015

(65) Prior Publication Data

US 2016/0097634 A1     Apr. 7, 2016

Related U.S. Application Data

(60) Provisional application No. 62/061,094, filed on Oct. 7, 2014.

(51) Int. Cl.
*G01B 11/16*    (2006.01)
*G02B 6/024*    (2006.01)
*G02B 6/12*     (2006.01)

(52) U.S. Cl.
CPC ............ *G01B 11/168* (2013.01); *G02B 6/024* (2013.01); *G02B 2006/12138* (2013.01)

(58) Field of Classification Search
CPC .... G01N 30/02; G01N 21/21; G01N 15/0205; G01N 2015/0288; G01N 2015/0294; G01N 2030/324; G01N 2030/625; G01N 21/253; G01N 21/4795; G01N 21/51; G01N 21/532; G01N 21/88; G01N 30/16; G01N 30/24
See application file for complete search history.

(56) References Cited

U.S. PATENT DOCUMENTS

| | | |
|---|---|---|
| 5,064,270 A | 11/1991 | Turpin et al. |
| 5,206,924 A | 4/1993 | Kersey |
| 5,712,704 A | 1/1998 | Martin et al. |
| 5,721,615 A | 2/1998 | McBride et al. |
| 6,278,811 B1 | 8/2001 | Hay et al. |
| 7,227,645 B2 | 6/2007 | Cyr |
| 7,920,253 B2 | 4/2011 | Cyr et al. |
| 8,599,385 B2 | 12/2013 | Chen et al. |
| 9,041,935 B2 | 5/2015 | Yao et al. |
| 9,476,699 B2 | 10/2016 | Yao |

(Continued)

OTHER PUBLICATIONS

Cyr, N., et al., "Random-scrambling tunable POTDR for distributed measurement of cumulative PMD," Journal of Lightwave Technology, 27(18):4164-4174, Sep. 2009.

(Continued)

*Primary Examiner* — Michael P Stafira
(74) *Attorney, Agent, or Firm* — Perkins Coie LLP

(57) ABSTRACT

Techniques and devices for measuring polarization crosstalk in polarization maintaining fiber by placing the PM fiber in a 1-dimensional or 2-dimensional configuration for sensing stress or strain exerted on the PM fiber at different locations along the fiber with a high spatial sensing resolution.

8 Claims, 17 Drawing Sheets

(56) References Cited

U.S. PATENT DOCUMENTS

| | | | |
|---|---|---|---|
| 2002/0020224 A1* | 2/2002 | Sato | G01B 11/18 73/803 |
| 2006/0081772 A1* | 4/2006 | Williams | G01B 11/161 250/227.14 |
| 2009/0282671 A1 | 11/2009 | Tao et al. | |
| 2010/0231911 A1 | 9/2010 | Fischer et al. | |
| 2011/0034912 A1 | 2/2011 | de Graff et al. | |
| 2011/0277552 A1 | 11/2011 | Chen et al. | |
| 2013/0321818 A1 | 12/2013 | Yao et al. | |
| 2016/0258743 A1 | 9/2016 | Yao | |

OTHER PUBLICATIONS

Ding, Z., et al., "Accurate method for measuring the thermal coefficient of group birefringence of polarization-maintaining fibers," Optics Letters, 36(11):2173-2175, Jun. 2011.

Ding, Z., et al., "Improving the quality of polarization-maintaining fiber coils using distributed polarization crosstalk testing," Journal of Optoelectronics. Laser. 21(3), 430-434, Mar. 2010.

Faustini, L., et al., "Bend loss in single-mode fibers," Journal of Lightwave Technology, 15(4):671-679, Apr. 1997.

Fercher, A.F., et al., "New dispersion compensation technique for Partial Coherence Interferometry (PCI) and Optical Coherence Tomography (OCT)," Optics Express, 9(12):610-615, Dec. 2001.

Flavin, D.A., et al., "Dispersion of birefringence and differential group delay in polarization-maintaining fiber," Optics Letters, 27(12):1010-1012, Jun. 2002.

Francois, P.L., et al., "Three ways to implement interfacial techniques: application to measurements of chromatic dispersion, birefringence, and nonlinear susceptibilities," Journal of Lightwave Technology, 7(3):500-513, Mar. 1989.

Gardner, W.B., et al., "Microbending loss in optical fibers," The Bell System Technical Journal, 54(2):457-465 Feb. 1975.

Glisic, B., et al., "Fiber optic method for health assessment of pipelines subjected to earthquake-induced ground movement," Structural Health Monitoring, 11(6):696-711, Aug. 2012.

Hlubina, P., et al., "Dispersion of group and phase modal birefringence in elliptical-core fiber measured by white-light spectral interferometry," Optics Express, 11(22):2793-2798, Nov. 2003.

Li, M.J., et al., "Ultra-low bending loss single-mode fiber for FTTH," Journal of Lightwave Technology, 27(3):376-382, Feb. 2009.

Li, Z., et al., "Complete characterization of polarization-maintaining fibers using distributed polarization analysis," Journal of Lightwave Technology, 33(2):372-380, Jan. 2015.

Li, Z., et al., "Method for improving the resolution and accuracy against birefringence dispersion in distributed polarization crosstalk measurements," Optics Letters, 37(14):2775-2777, Jul. 2012.

Martin, P., et al., "Test apparatus of distributed polarization coupling in fiber gyro coils using white light interferometry," Proc. SPIE, Fiber Optic Gyros: 15th Anniversary Conf, vol. 1585, pp. 173-179, Sep. 1991.

Saida, T., et al., "Distributed fiber-optic stress sensor by synthesis of the optical coherence function," IEEE Photonics Technology Letters, 9(4):484-486, Apr. 1997.

Shibata, N., et al., "Interference between two orthogonally polarized modes traversing a highly birefringent air-silica microstructure fiber," Journal of Lightwave Technology, 23(3):1244-1252, Mar. 2005.

Shibata, N., et al., "Temporal coherence properties of a dispersively propagating beam in a fiber-optic interferometer," Journal of the Optical Society of America A: Optics, Image Science, and Vision, 4(3):494-497, Mar. 1987.

Shlyagin, M., et al., "Birefringence dispersion measurement in optical fibers by wavelength scanning," Optics Letters, 20(8):869-871, Apr. 1995.

Sunnerud, H., et al., "Measurement of polarization mode dispersion accumulation along installed optical fibers," IEEE Photonics Technology Letters, 11(7):860-862, Jul. 1999.

Takada, K., et al., "Measurement of spatial distribution of mode coupling in birefringent polarization-maintaining fiber with new detection scheme," Optics Letters, 11(10):680-682, Oct. 1986.

Tang, F., et al., "Characterization of birefringence dispersion in polarization-maintaining fibers by use of white-light interferometry," Applied Optics, 46(19):4073-4080, Jul. 2007.

Tang, F., et al., "Distributed measurement of birefringence dispersion in polarization-maintaining fibers," Optics Letters, 31(23):3411-3413, Dec. 2006.

Ulrich, R., et al., "Bending-induced birefringence in single-mode fibers," Optics Letters, 5(6):273-275, Jun. 1980.

Wang, Q., et al, "Theoretical and experimental investigations of macro-bend losses for standard single mode fibers," Optics Express, 13(12):4476-4484, Jun. 2005.

Yao, Y., et al., "Crack detection and characterization techniques—An overview," Structural Control and Health Monitoring, 21(12):1387-1413, Mar. 2014.

Zendenhnam, A., et al., "Investigation of bending loss in a single-mode optical fiber," PRAMANA—Journal of Physics, 74(4):591-603, Apr. 2010.

* cited by examiner

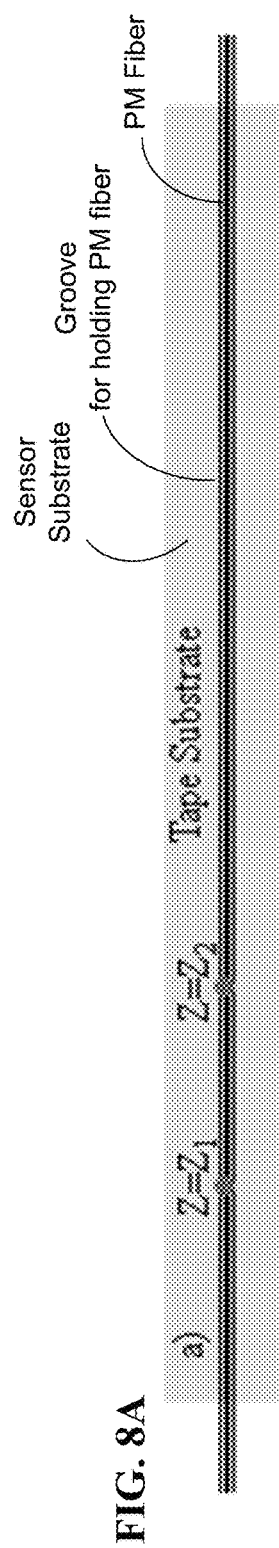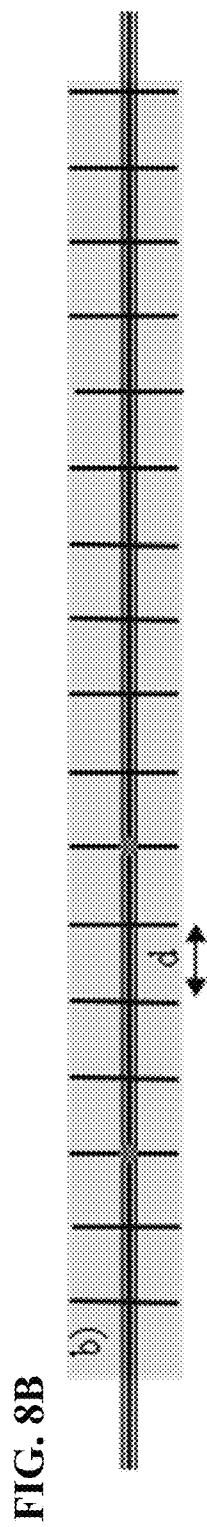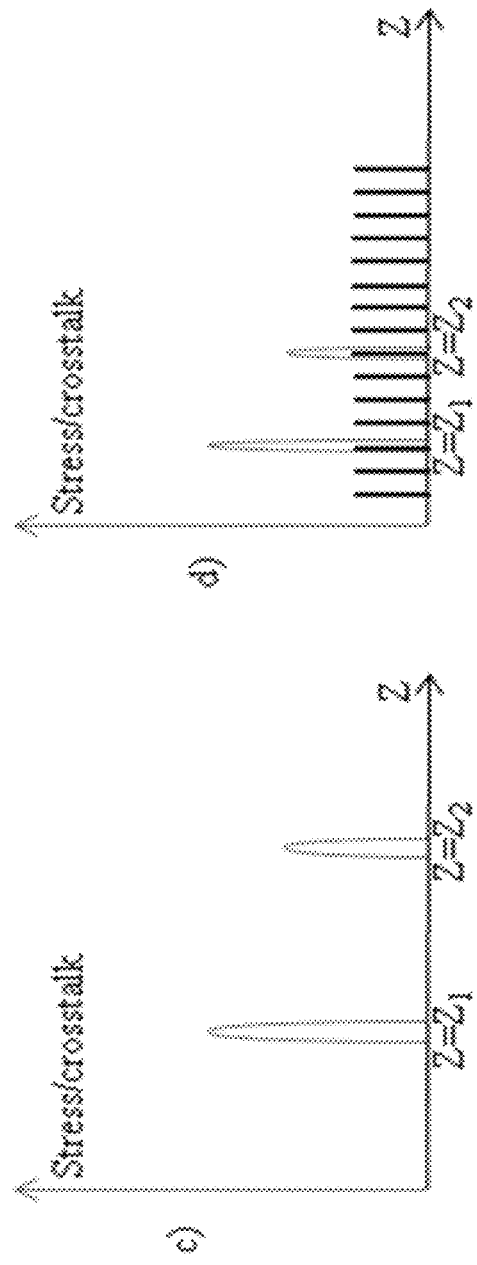
FIG. 8A
FIG. 8B
FIG. 8C
FIG. 8D

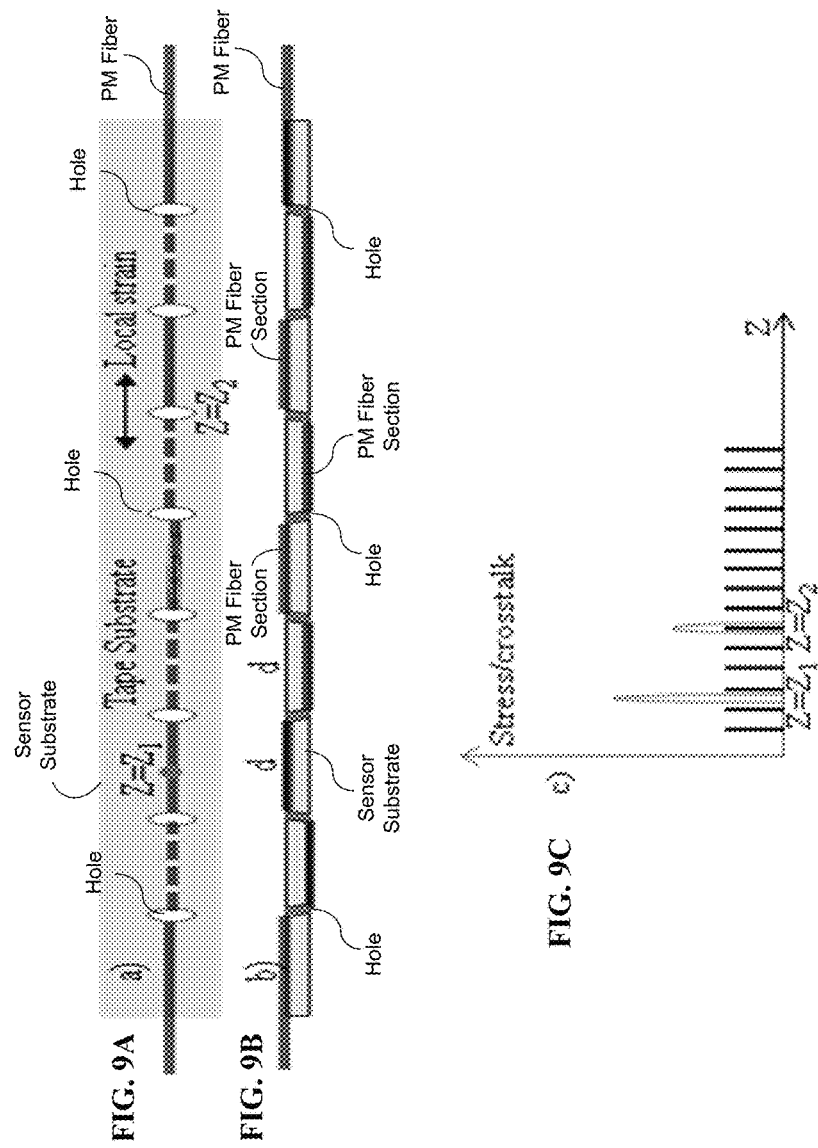

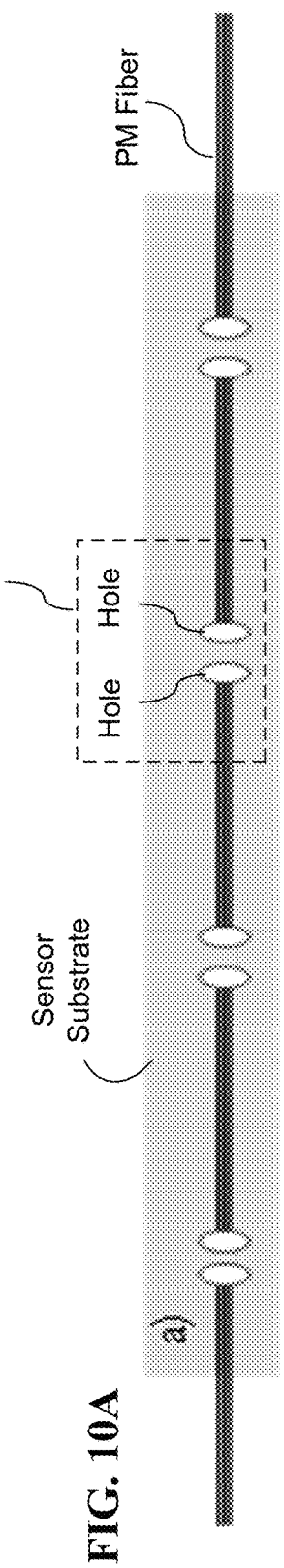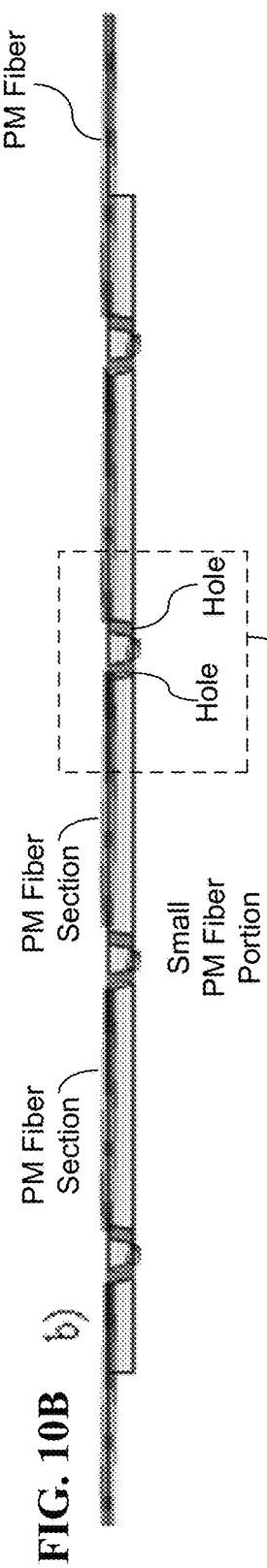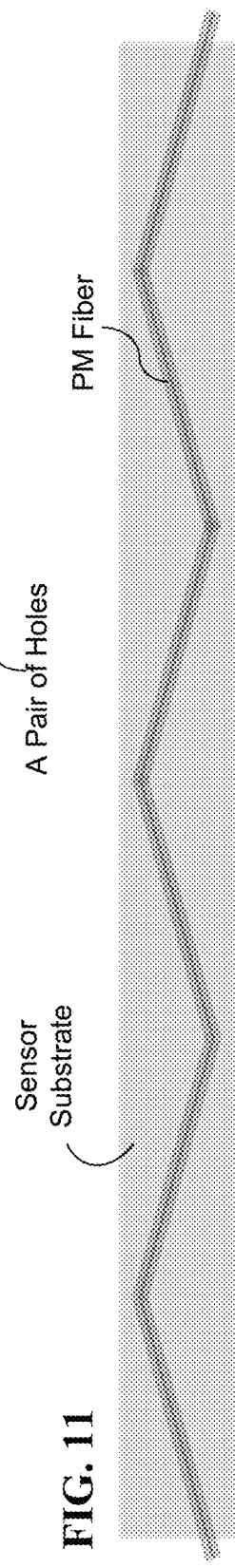
FIG. 10A
FIG. 10B
FIG. 11

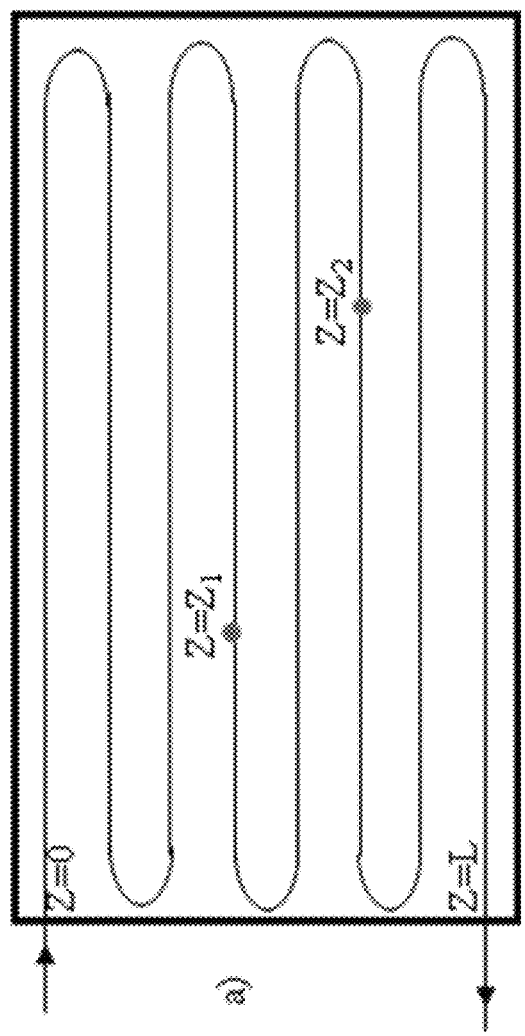
FIG. 12A
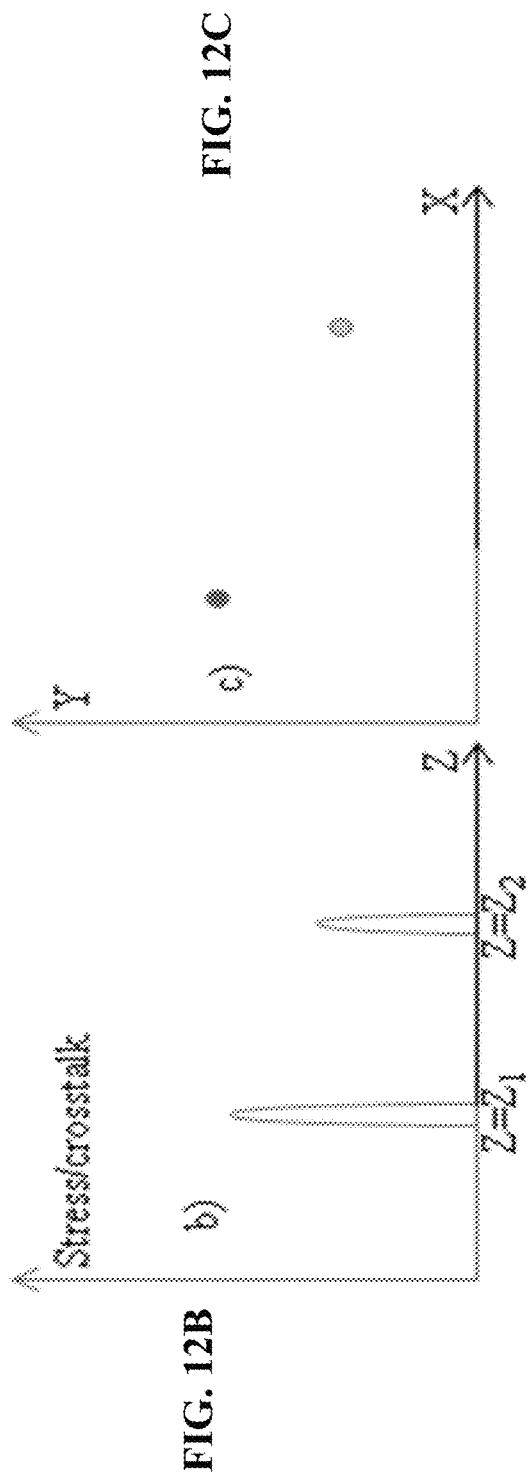
FIG. 12B
FIG. 12C

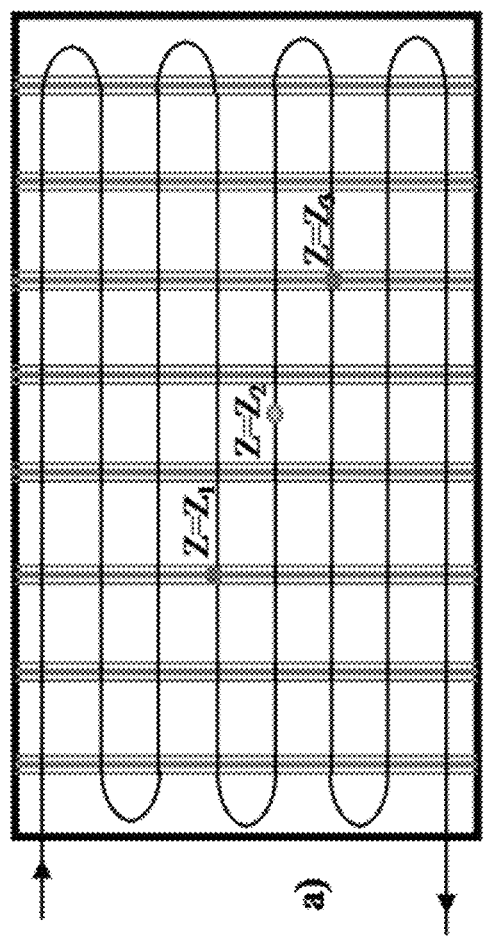
FIG. 13A
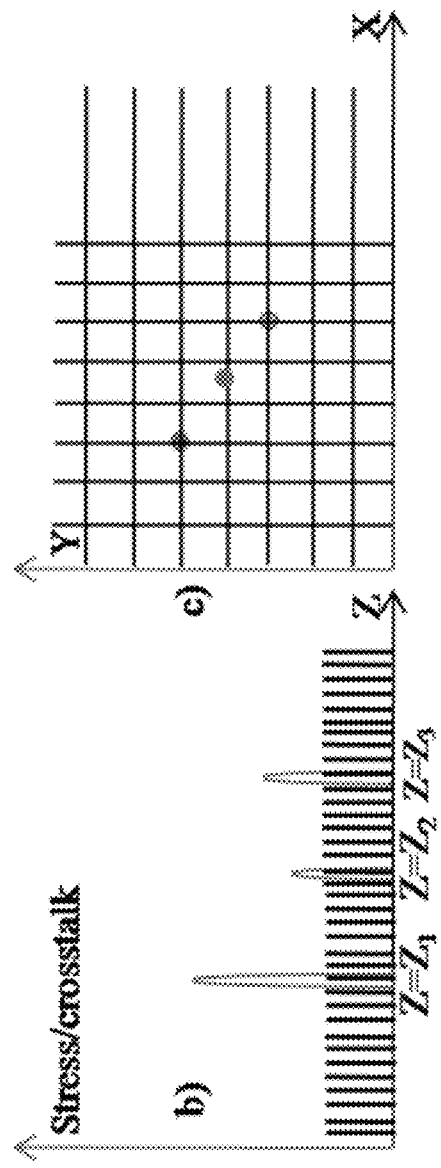
FIG. 13B
FIG. 13C

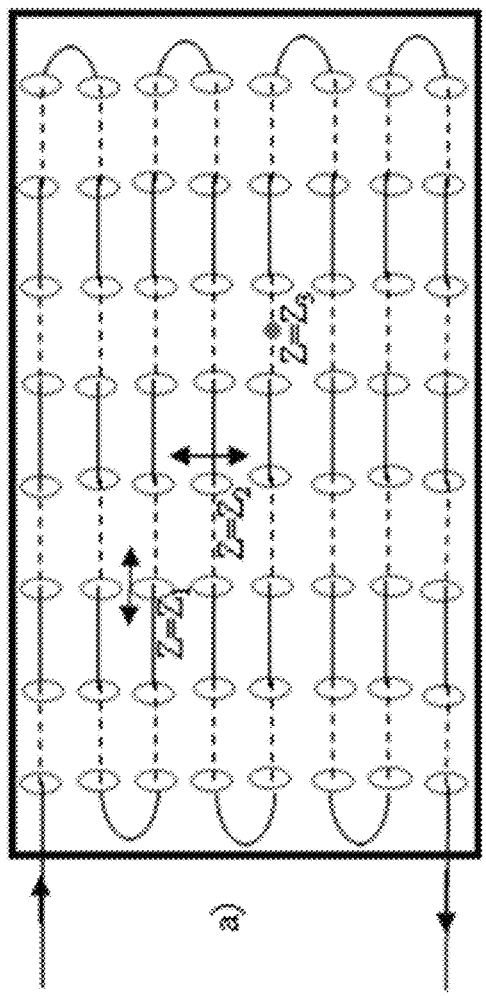
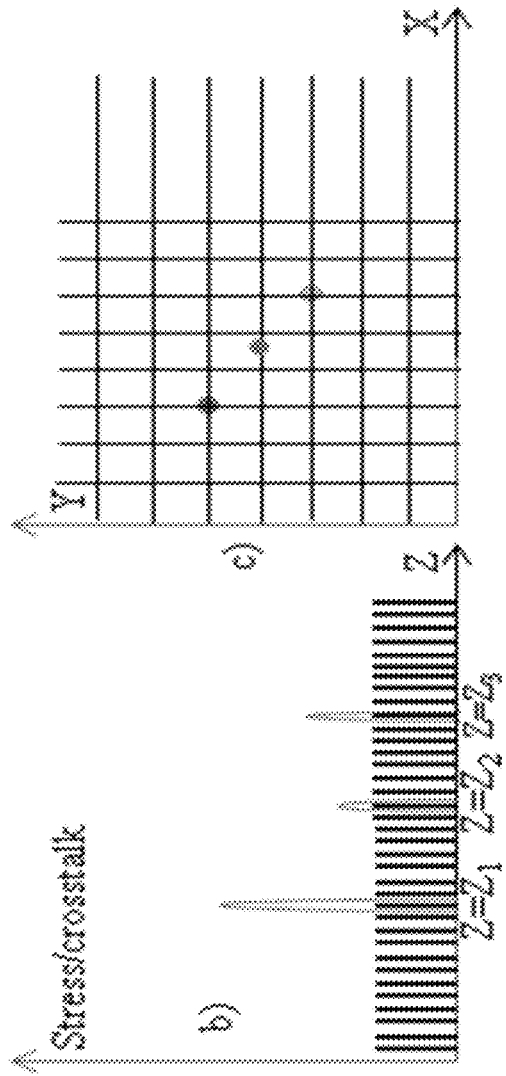
FIG. 14A
FIG. 14B
FIG. 14C

1-DIMENSIONAL AND 2-DIMENSIONAL DISTRIBUTED FIBER-OPTIC STRAIN AND STRESS SENSORS BASED ON POLARIZATION MAINTAINING FIBER USING DISTRIBUTED POLARIZATION CROSSTALK ANALYZER AS AN INTERROGATOR

CROSS REFERENCE TO RELATED APPLICATIONS

This patent document claims priority and benefits of U.S. Provisional Application No. 62/061,094, filed on Oct. 7, 2014, and entitled "HIGH-RESOLUTION DISTRIBUTED FIBER-OPTIC STRAIN AND STRESS SENSORS BASED ON POLARIZATION MAINTAINING FIBER USING DISTRIBUTED POLARIZATION CROSSTALK ANALYZER AS AN INTERROGATOR", which is incorporated by reference as part of the disclosure of this patent document.

BACKGROUND

This patent document relates to devices, systems and techniques for measuring stress or strain by using PM fiber based on polarization cross talk.

Optical polarization is an important parameter of an optical signal in various optical devices, systems and applications. The optical polarization of an optical signal can change or be altered by interacting with an optical medium having optical birefringence in which light experiences different refractive indices at different optical polarizations. Fibers, for example, may be optically birefringent and light propagating in such fibers can change its polarization. The birefringence of a fiber may change with time, often randomly with the fluctuations in the operating conditions such as stresses or temperatures in the fiber.

Polarization maintaining (PM) fiber is an example of an optical birefringent material and exhibits high birefringence and supports two discrete polarization modes, $HE^{Slow}_{11}$ and $HE^{fast}_{11}$, that are along mutually orthogonal slow and fast axes of the PM fiber. The refractive index of the PM fiber for light polarized along the slow axis in the mode $HE^{Slow}_{11}$ is higher than the refractive index of the PM fiber for light polarized along the fast axis in the mode $HE^{fast}_{11}$. When the light coupled into the PM fiber is linearly polarized along the slow axis of the PM fiber, only $HE^{Slow}_{11}$ mode is excited and the optical polarization of the guided light is maintained along the slow axis; conversely, when the light coupled into the PM fiber is linearly polarized along the fast axis of the PM fiber, only $HE^{fast}_{11}$ mode is excited and the optical polarization of the guided light is maintained along the fast axis. This characteristics of preserving optical polarization in the PM fiber can be used in various applications, such as fiber optic gyroscopes, integrated optics devices, high-performance interferometer and Polari metric sensors, quantum key distribution, and fiber lasers. Perturbations to PM fiber, such as stresses exerted on PM fiber, may cause optical coupling or crosstalk between the two orthogonal polarization modes where optical energy of one polarization mode transfers to optical energy of another polarization mode or vice versa.

An optical fiber tends to be subject to bending, forces or stresses in applications. For example, fibers used for an optical network or fiber communication link, such as International Telecommunication Union recommended ITU-T G.652 single-mode optical fiber and cable, would suffer a fiber bend or stress loss which may adversely affect the performance or reliability of the fiber. Such fiber bending or stress could be measured various ways, including using a commercial multiple-wavelength optical time domain reflectometer (OTDR), e.g. at 1310 nm or 1550 nm, to distinguish a bend loss from other types of losses, e.g. broken, connection loss, etc., uses measured different bend losses information at different wavelengths where usually a bend loss is higher at a short wavelength than that of at a long wavelength.

SUMMARY

This document includes techniques and devices for measuring stress or strain based on polarization crosstalk analysis in birefringence optical birefringent media including polarization maintaining fiber. The disclosed techniques and devices can be implemented to measure polarization crosstalk distribution in polarization maintaining fiber by placing the PM fiber in a 1-dimensional or 2-dimensional configuration for sensing stress or strain exerted on the PM fiber at different locations along the fiber with a high spatial sensing resolution.

In one aspect, the disclosed technology includes a novel type of distributed fiber-optic strain sensors using polarization maintaining (PM) fiber as the sensing medium. It has the potential to realize both advantages of discrete sensors and distributed sensors. The disclosed sensors can be configured as distributed in 1D and 2D, able to cover large area of structures; second, it has very accurate measurement with a spatial resolution of 6 cm and a sensing range of more than 3 km, which is enabled by the technology of ghost-peak free distributed polarization crosstalk analyzer (DPXA), commercially available from General Photonics Corporation.

In another aspect, an optical fiber sensor device is provided to include a sensor plate formed of a deformable or elastic material; a length of polarization maintaining (PM) fiber as a sensing element and engaged to the sensor plate at multiple engaging locations; an optical light source that produces probe light and is coupled to the PM fiber to deliver the probe light into the PM fiber; and a detector module coupled to receive probe light from the PM fiber and to measure the received probe light to determine a stress exerted on the sensor plate.

In another aspect, an optical fiber sensor device is provided to include a sensor plate configured to include a 1-demensional array of holes; a length of polarization maintaining (PM) fiber engaged to the sensor plate by being threaded through the holes to form sensing locations at the holes; an optical light source that produces probe light and is coupled to the PM fiber to deliver the probe light into the PM fiber; and a detector module coupled to receive probe light from the PM fiber and to measure the received probe light to determine a stress exerted on the sensor plate.

In yet another aspect, an optical fiber sensor device is provided to include a sensor plate configured to include a groove in a 2-dimensional pattern on one side; a length of polarization maintaining (PM) fiber engaged to the sensor plate by being placed in the groove to form a 2-dimensional PM fiber sensing element; an optical light source that produces probe light and is coupled to the PM fiber to deliver the probe light into the PM fiber; and a detector module coupled to receive probe light from the PM fiber and to measure the received probe light to determine a stress exerted on the sensor plate.

BRIEF DESCRIPTION OF DRAWINGS

FIG. 1A shows the components of the device, FIG. 1B illustrates the orientation of the optical polarizer with respect to optical axes of the PM fiber and FIG. 1C illustrates a situation where stresses are present at multiple locations along the PM fiber to induce cross talk between the two orthogonal polarization modes of the PM fiber.

FIG. 8A through FIG. 11 show examples of 1-dimensional PM fiber sensors.

FIG. 12A through FIG. 16B show examples of 2-dimensional PM fiber sensors.

DETAILED DESCRIPTION

Figure 1:
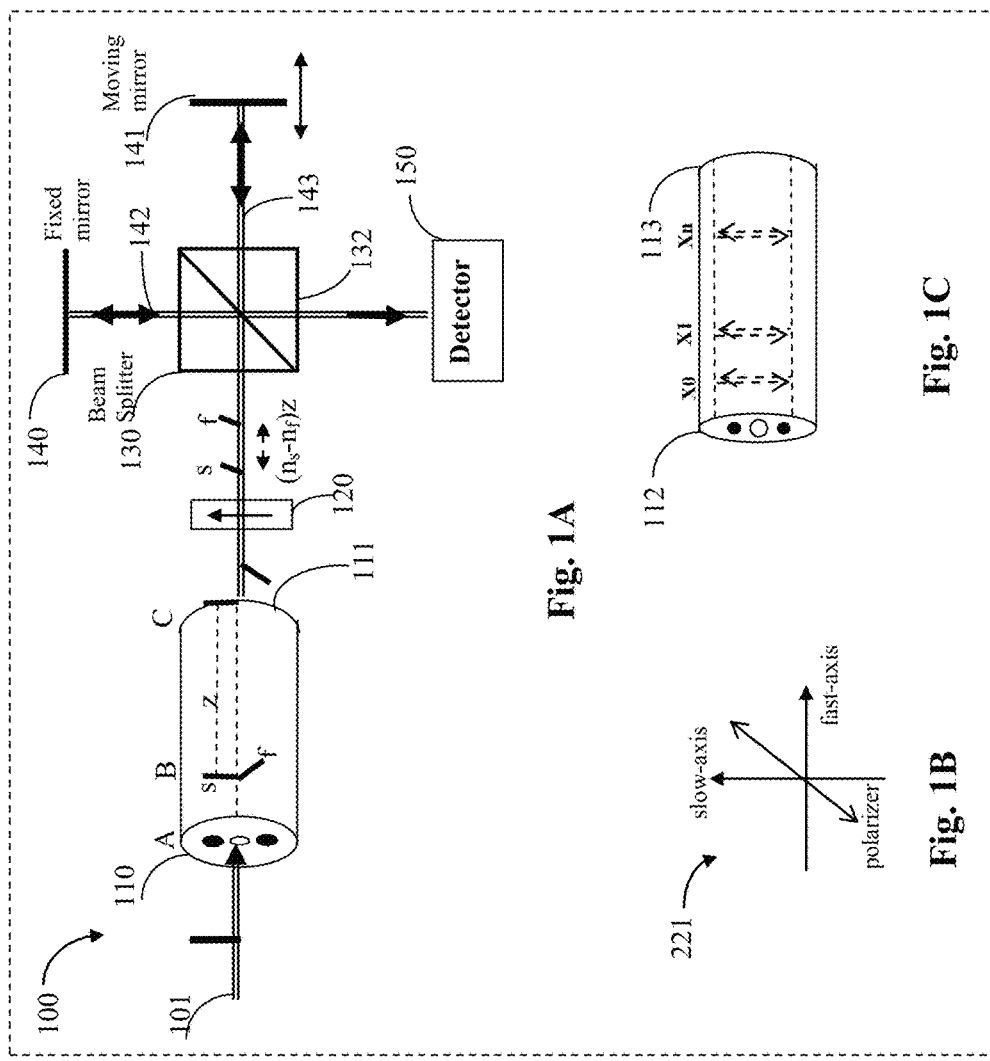
FIG. 1 shows an exemplary device for measuring spatial distribution of polarization crosstalk in an optical birefringent medium (e.g., a PM fiber) by using an optical interferometer, where

Examples for implementing techniques and devices in measuring stress or strain based on polarization crosstalk between two polarization modes in an optical birefringent medium are provided based on optical interferometric measurements of PM fiber. The described techniques and devices can be used to effectively suppress undesired spectral broadening caused by optical birefringent dispersion in the PM fiber. One of the features in the disclosed technology is that broadband light can be used in the described techniques and devices to obtain spatially resolved distribution of stresses along the PM fiber by analyzing stress-induced polarization cross-coupling along the length of the PM fiber. High measurement sensitivity, a wide dynamic range, and high spatial measurement accuracy can be achieved by using the described techniques and devices.

Fiber optic strain sensors can be engineered to provide one or more advantages including, e.g., high precision, long-term stability, and durability. In addition, fiber optic techniques allow for affordable instrumentation of large areas of civil structures and infrastructure enabling global large-scale monitoring based on distributed sensors. The disclosed technology here includes a novel type of distributed fiber-optic strain sensors based on polarization maintaining (PM) fiber with a desired spatial resolution (e.g., a spatial resolution of around 6 cm), enabled by the ghost-peak free distributed polarization crosstalk analyzer (DPXA) as an interrogator. A strain field over such sensors can lead to crosstalk change in the PM fiber deployed as the stress or strain sensing element, which can be measured by the DPXA. As specific examples, two categories of distributed sensors are disclosed: one-dimensional (1D) sensor strip and two-dimensional (2D) sensor panel, and two specific designs are presented for each category. Sample sensors were tested by conducting tension experiments to quantify the relationship between crosstalk change and applied strain, which shows a linear positive correlation. The test results demonstrate that such 1D or 2D distributed sensors based on PM fiber have the potential in large-scale structural health or integrity monitoring of various structures, including civil infrastructure, both in 1D and 2D, performing as an alternative of traditional fiber-optic strain sensors.

In implementations, an optical fiber sensor device for the disclosed 1D sensor strips or 2D sensor panels can be configure to include a sensor plate formed of a deformable or elastic material, a length of polarization maintaining (PM) fiber as a sensing element and engaged to the sensor plate at multiple engaging locations, an optical light source that produces probe light and is coupled to the PM fiber to deliver the probe light into the PM fiber, and a detector module coupled to receive probe light from the PM fiber and to measure the received probe light to determine a stress exerted on the sensor plate. The engagement mechanism for engaging the PM fiber to the sensor plate is designed to provide multiple engaging or contacting locations that divide the PM fiber into PM fiber sections, either in a 1D linear configuration or in a 2D array configuration, for sensing the changes in the strain or stress distribution at the PM fiber sections at different locations on a target structure such as a device, a building, a bridge or other items. The sensor plate is formed of a deformable or elastic material to allow the sensor plate which is engaged to the target structure to deform with the target structure for the sensing operation.

One of the applications or uses of the disclosed technology is meeting the needs for measuring stress or strain distributions in buildings and other large structures. The structural integrity and safety of buildings and large structures are of a particular concern for various aging civil infrastructures, such as sites identified by several institutions, including the Federal Highway Administration (FHWA), the Transportation and Research Board (TRB), and the National Institute of Standards and Technology (NIST). In 2004, approximately 150,000 U.S. bridges were identified as structurally deficient or functionally obsolete. The American Society of Civil Engineers (ASCE) estimates that if the current deterioration trends for surface transportation infrastructure continue, annual costs on the U.S. economy will increase by 351%, i.e., to $520 billion, by 2040 and will cost the national economy more than 400,000 jobs. The collapse of the 135W Minneapolis Bridge is a representative example of the potentially catastrophic consequences: 13 lives lost and 145 people injured; unavailability of the river crossing, leading to estimated economic losses of $60M; and rebuilding costs of approximately $234M. The budget allocated for maintenance and repair is disproportionately small for appropriately addressing all the problems of these deficient bridges. Thus reliable, low-cost, and easy-to-adopt structural health monitoring is an immediate and urgent need in order to accurately assess the state of bridges, improve the safety of the structures, and set priorities for allocating funds for maintenance and repair. Structural health monitoring (SHM) is a process for providing accurate and in-time information concerning structural health condition and performance. SHM can be used to prevent the adverse social, economic, ecological, and aesthetic impacts that may occur in the case of structural deficiency, and can be critical to the emergence of sustainable civil and environmental engineering.

The sensors disclosed here can be configured as fiber optic strain sensors (FOSS) for SHM applications. Some examples of the advantages of FOSS are high accuracy and long-term stability, durability, and insensitivity to electromagnetic influences, corrosion and humidity. qualitative difference between the monitoring performed using discrete sensors and distributed sensors is the following: discrete sensors monitor strain or average strain in discrete points, while the distributed sensors are capable of one-dimensional (linear) strain field monitoring. Distributed sensors can be installed along the whole length of structure. Since the sensor is sensitive at each point of its length, each cross-section of the structure is effectively instrumented. Discrete and distributed sensors each have their advantages and challenges. Discrete sensors cover less area on the structure (and thus are less likely to directly detect damage), but they feature excellent accuracy and long-term stability. On the other hand, distributed sensors cover large areas of structure, but their accuracy is at least an order of magnitude worse than the accuracy of discrete sensors. Both types of sensor allow successful development of monitoring methods for damage detection and characterization (localization and quantification).

This application discloses implementations of a novel type of distributed fiber-optic strain sensors using polarization maintaining (PM) fiber as the sensing medium. The disclosed technology can be implemented to achieve both advantages of discrete and distributed sensors. For example, the disclosed devices can be configured as distributed 1D or 2D sensors, capable of covering a large spatial span or area of structures; the disclosed devices can be used to provide accurate measurements with a relatively high spatial resolution (e.g., 6 cm in some configurations) and a relatively large sensing range (e.g., more than 3 km in some configurations), which is enabled by a ghost-peak free distributed polarization crosstalk measurement technology developed by General Photonics Corporation.

Various features of techniques and devices or systems for measuring the stress or strain distribution in a PM fiber based on optical interferometric measurements of the PM fiber are related to the technique and devices disclosed in this document and can be found in U.S. Pat. No. 8,599,385 entitled "MEASURING DISTRIBUTED POLARIZATION CROSSTALK IN POLARIZATION MAINTAINING FIBER AND OPTICAL BIREFRINGENT MATERIAL" and assigned to General Photonics Corporation, and U.S. Patent Application Publication No. US2013/0321818 A1 of U.S. patent application Ser. No. 13/482,813 entitled "MEASURING POLARIZATION CROSSTALK IN OPTICAL BIREFRINGENT MATERIALS AND DEVICES BASED ON REDUCTION OF LINE BROADENING CAUSED BY BIREFRINGENT DISPERSION" and assigned to General Photonics Corporation. The entire disclosures of the above two patent documents are incorporated by reference as part of this patent document.

In a PM fiber, when the launched light is perfectly aligned along slow or fast axis at the input of the PM fiber, the optical coupling between the two polarization modes in the PM fiber occurs because intrinsic defects exist in the PM fiber or/and external stresses exerted on the PM fiber. The mode coupling between the slow axis and fast axis of the PM fiber can be characterized with polarization crosstalk. One way to represent the polarization crosstalk is the light intensity ratio between the light in the two polarization modes with optical polarizations along the slow and fast axes, respectively. In practical applications, it is desirable to identify the position of the polarization crosstalk in the PM fiber and to measure the degree of the polarization crosstalk. For example, in some fiber optic gyroscopes applications, the polarization crosstalk measurements can be used to screen the PM fiber before winding PM coil and to control crosstalk degradation during coil winding and to diagnose the PM coil problem after winding. The PM fiber can be used as an optical sensing medium and the polarization crosstalk can be used as a sensing mechanism. For example, the polarization crosstalk measurements can be used to obtain the stress distribution along the PM fiber and monitor space-resolved structural changes along bridges, tunnels, dams, pipeline or pipes for transporting a liquid (e.g., oil) or a gas (e.g., natural gas), or buildings. The polarization crosstalk measurements can also be used to detect an intrusion to a PM fiber link because mechanical disturbances to the PM fiber introduced by the intrusion causes polarization coupling in the PM fiber. The polarization crosstalk measurements can be used for PM fiber quality inspection by identifying defective sections of PM fiber where the crosstalk occurs, enabling the manufacturers or users to remove the defective fiber sections or take preventive measures to mitigate the impact of such defects. The polarization crosstalk measurements can also be used for measuring high polarization extinction ratios of a polarizing waveguide, obtaining the autocorrelation function of a light source, measuring the birefringence of a PM fiber and the lengths of PM fibers and single-mode (SM) fibers, and matching the optical path lengths of an interferometer.

Optical interference between light waves along the slow and fast axes of the PM fiber can generate real optical interference signals generated at the cross coupling locations in the PM fiber and ghost interference signals caused by the multiple coupling of light wave among multiple crosstalk points. The ghost signals can be strong when there are several strong coupling points on PM fiber, and thus result in wrong identification of crosstalk position and amplitude.

FIG. 1 shows an exemplary device 100 for measuring spatial distribution of polarization crosstalk along a PM fiber by using an optical interferometer, where FIG. 1A shows components of the device, FIG. 1B illustrates the orientation of the optical polarizer with respect to optical axes of the PM fiber and FIG. 1C illustrates a situation where stresses are present at multiple locations along the PM fiber to induce cross talk between the two orthogonal polarization modes of the PM fiber.

In this example, a broadband light (101) from a broadband light source is directed into the PM fiber at position A (110). The light (101) has one polarization component aligned to the slow axis of the PM fiber. Stress at position B induces polarization coupling between the two orthogonal polarizations along the fast and slow axes of the PM fiber and produces a polarization component aligned to the fast axis. Because the two polarization components travel at different group velocities in the PM fiber, the two polarization components experience a delay difference at the output (111) of the fiber (position C):

$$\Delta z = n_s z - n_f z = \Delta n z \qquad (1)$$

where $n_s$ and $n_f$ are the refractive indices of the slow and fast axes, respectively, the difference between the two refractive indices $\Delta n$ is the birefringence, and z is the distance between the coupling point B and the output point C. If an optical polarizer (120) with its optical polarization axis oriented at 45 degrees from the slow axis (FIG. 1B) is placed after the fiber output (111), one half of the optical power in each of the two polarization components passes through the polarizer (120) and emerges with the same polarization state which is linear, aligned to the polarizer axis of the polarizer (120).

Therefore, when an optical interferometer is used to receive the output light from the polarizer (120), the presence of the polarizer (120) can cause the received light, which includes two polarization components that are respectively in the two polarization modes in the PM fiber, to optically interfere. This optical interference can then be used to perform the polarization crosstalk measurements.

In FIG. 1, a Michelson interferometer is shown as an example for implementing the optical interferometer. A beam splitter 130 is provided to receive the output light from the polarizer 120 and splits the received light into a first beam along a first optical path 142 to a fixed mirror 140 and a second beam along a second optical path 143 to a movable mirror 141. An actuator is engaged to the movable mirror 141 to move the position of the movable mirror 141 to adjust the optical path length of the second optical path 143 relative to the first optical path 142. The two mirrors 140 and 144 reflect the two beams back to retrace the first and second optical paths to reach the beam splitter 130. The reflected beams from the two mirrors 140 and 141 spatially overlap with each other at the beam splitter 130 and optically interfere to produce the optical output 132 which contains the optical interference signal which has periodic interference peaks as the mirror 141 is moved in position. The distance associated with the movement of the mirror 141 between the two adjacent interference peaks in the optical interference signal is $\Delta n z$ and, accordingly, from Eq. (1), the location of the coupling point in the PM fiber is $z = \Delta z / \Delta n$. The coupling point can therefore be located using the interference graph. The coupling ratio can also be calculated from the strength of the interference peaks.

FIG. 1C illustrates presence of multiple coupling points in the PM fiber. Under this condition, the measurement process is more complicated. Assuming there are (n+1) coupling points $(x_0\ x_1\ x_2\ \ldots\ x_n)$ in the PM fiber, a linearly-polarized input wave packet (112) along the slow axis splits to $2^n$ small wave packets along the slow axis and $2^n$ small wave packets along the fast axis at the output end of PM fiber (113). Therefore, after the ith coupling point, the two wave packets sequences $P_{si}$ and $P_{fi}$ polarized along the slow axis and fast axis respectively include $2^i$ wave packets in each sequence and their optical paths length can be described as $$P_{s_i} = \begin{pmatrix} P_{s_i,1} \\ P_{s_i,2} \\ \vdots \\ P_{s_i,j} \\ \vdots \\ P_{s_i,2^i} \end{pmatrix} \quad P_{f_i} = \begin{pmatrix} P_{f_i,1} \\ P_{f_i,1} \\ \vdots \\ P_{f_i,j} \\ \vdots \\ P_{f_i,2^i} \end{pmatrix} \quad (2)$$

where $P_{si,j}$ (j=1 to $2^i$) and $P_{fi,j}$ (j=1 to $2^i$) represent the optical patch lengths of the jth wave packet in sequences $P_{si}$ and $P_{fi}$, respectively. The optical path length of the wave packet sequences after the (i+1)th coupling point can be calculated by $$P_{s_{i+1}} = P_{f_{i+1}} = \begin{pmatrix} (x_{i+1} - x_i)n_s + P_{s_i 1} \\ (x_{i+1} - x_i)n_s + P_{s_i 2} \\ \vdots \\ (x_{i+1} - x_i)n_s + P_{s_i,2^i} \\ (x_{i+1} - x_i)n_f + P_{f_i 1} \\ (x_{i+1} - x_i)n_f + P_{f_i 2} \\ \vdots \\ (x_{i+1} - x_i)n_f + P_{f_i,2^i} \end{pmatrix}, \quad (3)$$

Based on formula (3), the optical path length of the wave packet at output of PM fiber can be obtained by $$P_{sn} = \quad (4)$$

$$P_{fn} = \begin{pmatrix} (x_n - x_{n-1})n_s + Ps_{n-1,1} \\ (x_n - x_{n-1})n_s + Ps_{n-1,2} \\ \vdots \\ (x_n - x_{n-1})n_s + P_{si-1,2^{n-1}} \\ (x_n - x_{n-1})n_f + Pf_{n-1,1} \\ (x_n - x_{n-1})n_f + Pf_{n-1,2} \\ \vdots \\ (x_n - x_{n-1})n_f + Pf_{n-1,2^{n-1}} \end{pmatrix} = \begin{pmatrix} (x_n - x_0)n_s \\ (x_n - x_{n-1})n_s + Ps_{n-1,2} \\ \vdots \\ (x_i - x_{n-1})n_s + Ps_{n-1,2^{n-1}} \\ (x_n - x_{n-1})n_f + Pf_{n-1,1} \\ (x_n - x_{n-1})n_f + Pf_{n-1,2} \\ \vdots \\ (x_n - x_{n-1})n_f + Pf_{n-1,2^{n-1}-1} \\ (x_n - x_0)n_f \end{pmatrix}$$

and the corresponding intensity $I_{sn}$ and $I_{fn}$ of wave packet sequences $P_{sn}$ and $P_{fn}$ can be calculated by the following formulae:

$$Is_n = \frac{Is_{n-1}}{1+c_n} \oplus \frac{c_n}{1+c_n} If_{n-1} = \quad (5)$$

$$\begin{pmatrix} Is_{n-1,1}/(1+c_n) \\ Is_{n-1,2}/(1+c_n) \\ Is_{n-1,3}/(1+c_n) \\ \vdots \\ Is_{n-1,2^{i-1}}/(1+c_n) \\ If_{n-1,1} * c_n/(1+c_n) \\ If_{n-1,2} * c_n/(1+c_n) \\ If_{n-1,3} * c_n/(1+c_n) \\ \vdots \\ If_{n-1,2^{n-1}} * c_n/(1+c_n) \end{pmatrix} \approx \begin{pmatrix} Is_{n-1,1}/(1+c_n) \\ Is_{n-1,2}/(1+c_n) \\ Is_{n-1,3}/(1+c_n) \\ \vdots \\ Is_{n-1,2^{i-1}}/(1+c_n) \\ 0 \\ 0 \\ 0 \\ \vdots \\ 0 \end{pmatrix}$$

-continued $$If_n = \frac{c_n}{1+c_n} Is_{n-1} \oplus \frac{1}{1+c_n} If_{n-1} = \qquad (6)$$

$$\begin{pmatrix} Is_{n-1,1} * c_n/(1+c_n) \\ Is_{n-1,2} * c_n/(1+c_n) \\ Is_{n-1,3} * c_n/(1+c_n) \\ \vdots \\ Is_{n-1,2^{i-1}} * c_n/(1+c_n) \\ If_{n-1,1}/(1+c_n) \\ If_{n-1,2}/(1+c_n) \\ If_{n-1,3}/(1+c_n) \\ \vdots \\ If_{n-1,2^{n-1}}/(1+c_n) \end{pmatrix} \approx \begin{pmatrix} 0 \\ 0 \\ 0 \\ \vdots \\ 0 \\ If_{n-1,1}/(1+c_n) \\ If_{n-1,2}/(1+c_n) \\ If_{n-1,3}/(1+c_n) \\ \vdots \\ If_{n-1,2^{n-1}}/(1+c_n) \end{pmatrix}$$

where $c_n$ is the coupling coefficients at point xn, and can be used to represent a crosstalk parameter defined by Crosstalk=abs($10*\log c_n$).

After passing through the 45° aligned polarizer (120), the two wave packet sequences $P_{sn}$ and $P_{fn}$, originally polarized along the slow axis and fast axis in the PM fiber, will be the mixed into one wave packet sequence polarized along transmission direction of the polarizer (120). The optical path length P and the corresponding optical intensity of the wave packet sequence polarized along transmission direction of the polarizer (120) can be calculated as $$P = \begin{pmatrix} p1 \\ p2 \\ p3 \\ \vdots \\ \vdots \\ \vdots \\ \vdots \\ p_{2^n} \end{pmatrix} = \begin{pmatrix} (x_n - x_{n-1})n_s \\ (x_n - x_{n-1})n_s + Ps_{n-1,2} \\ \vdots \\ (x_n - x_{n-1})n_s + Ps_{n-1,2^{n-1}} \\ (x_n - x_{n-1})n_f + Pf_{n-1;1} \\ (x_n - x_{n-1})n_f + Pf_{n-1,2} \\ \vdots \\ (x_n - x_{n-1})n_f + Pf_{n-1,2^{n-1}-1} \\ (x_n - x_0)n_f \end{pmatrix} = \begin{pmatrix} P_{s_{n-1}} \\ P_{f_{n-1}} \end{pmatrix} \qquad (7)$$

$$I \approx \begin{pmatrix} Is_{n-1,1}/(1+c_n) \\ Is_{n-1,2}/(1+c_n) \\ Is_{n-1,3}/(1+c_n) \\ \vdots \\ Is_{n-1,2^{i-1}}/(1+c_n) \\ If_{n-1,1}/(1+c_n) \\ If_{n-1,3}/(1+c_n) \\ If_{n-1,3}/(1+c_n) \\ \vdots \\ If_{n-1,2^{n-1}}/(1+c_n) \end{pmatrix} = \begin{pmatrix} Is_{n-1} \\ If_{n-1} \end{pmatrix} \qquad (8)$$

As the mirror 141 moves to change its position in the second optical path, any two pulses in wave packet sequence P (see formula 7) can generate an interference signal and the position of interference pattern is determined by the delay difference between these two pulses. There are total $2^n*(2^n-1)/2$ peaks that are generated in which there are n interference peaks representing the actual coupling points and the rest of the interference peaks are ghosts peaks. These ghost peaks not only generate fake coupling signals, but also can possibly produce compositions at the true interference peaks associated with the true coupling locations. Therefore, the presence of the ghost peaks degrades the measurement accuracy in measuring the crosstalk distribution and amplitude.

Formulae (7) and (8) show that, the wave packet sequence has two groups, one represented by the top half of Formula (7) and comes from $Psn_{-1}$ polarized along the slow-axis when in the PM fiber, and another is represented by the bottom half of Formula (7) and comes from $Pf_{n-1}$ polarized along the fast axis when in the PM fiber. The positions of interference patterns between any two pulses in the group $Ps_{n-1}$ have nothing to do with the length of the last PM segment $(x_n-x_{n-1})$, and their delay difference are all shorter than the $(x_{n-1}-x0)*\Delta n$. The positions of interference patterns between any two pulses in the group $Pf_{n-1}$ also has nothing to do with the length of last PM segment $(x_n-x_{n-1})$, and their delay difference are all less than the $(x_{n-1}-x0)*\Delta n$. For the interference between top and bottom half of wave packet P, the delay difference between any one wave packets from group of $Ps_{n-1}$ and $Pf_{n-1}$, respectively, is $(x_n-x_{n-1})\Delta n+(Ps_{n-1,j}-Pf_{n-1,k})$. If the length of the last PM segment $x_n-x_{n-1}$ is longer than the length of the total length $(x_{n-1}-x_0)$ of the PM segments from 0 to n−1, the interference peaks will split into two groups at position. One group is generated by the interference between any two wave packets in sequence $Ps_{n-1}$ or $P_{sf-1}$; another group is generated by the interference between one wave packet in sequence $Psn-1$ and one in $P_{sf-1}$ respectively. A high value for the extinction ratio (ER) of a PM fiber link generally suggests that the coupling coefficients of c1, c2 . . . ci in the PM fiber link are very small so the pulse P1 in formula (7) has a relatively high power. If the wave packets generated by over two times coupling and over three order's interference are ignored, there are only n interference signals in the second interference group and the corresponding delay difference between the first optical path 142 as the reference arm of the optical interferometer (in FIG. 1A) and the second optical path 143 as the changing arm of the optical interferometer are:

$$(x_n - x_{n-1})\Delta n + \begin{pmatrix} 0 \\ (x_{n-1} - x_{n-2})\Delta n \\ (x_{n-1} - x_{n-3})\Delta n \\ \vdots \\ \vdots \\ (x_{n-1} - x_0)\Delta n \end{pmatrix} \qquad (9)$$

which corresponds to the coupling points from 0 to n−1 at the PM fiber.

Figure 2:
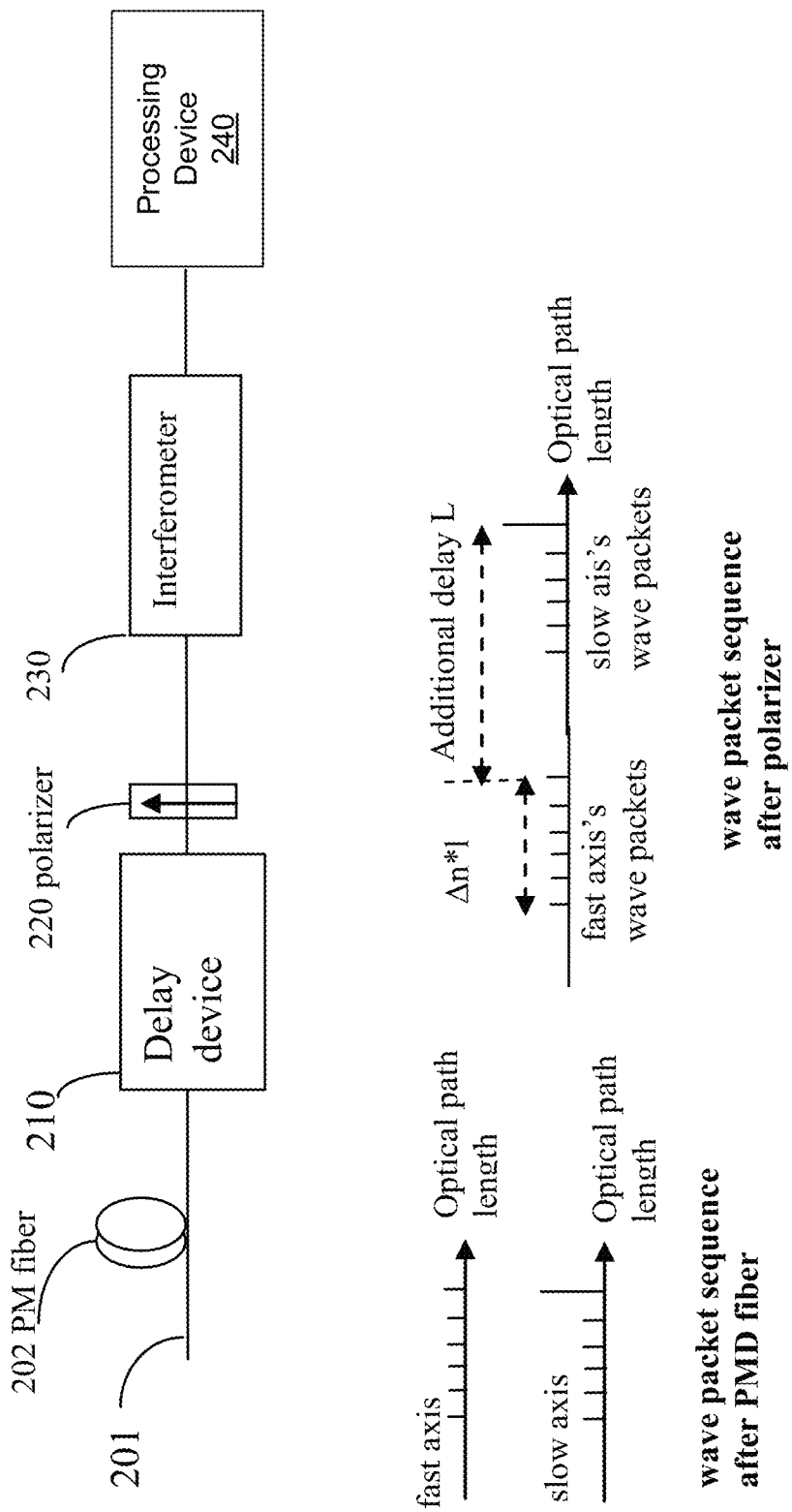
FIG. 2 shows an exemplary device for measuring polarization crosstalk in an optical birefringent medium (e.g., a PM fiber) by providing an optical delay device between the PM fiber under test and the optical interferometer, where inserts further illustrate operation of the device.

To reduce the ghost interference peaks, an optical delay can be inserted between the PM fiber and the polarizer (212) to selectively cause an additional delay in light in one of the two polarization modes of the PM fiber. FIG. 2 shows an exemplary device for measuring spatial distribution of polarization crosstalk along a PM fiber by providing an optical delay device between the PM fiber under test and the optical interferometer, where inserts further illustrate operation of the device. The input light (201) is split to two orthogonal sequences wave packets after passing though the PM fiber under test (202) and the two sequences are polarized along the slow-axis and the fast-axis of the PM fiber, respectively. The delay device 210 adds an additional delay L between these two orthogonal wave packet sequences, and the delay L in vacuum should be longer than $\Delta n*1$ where $\Delta n$ is the birefringence of the PM fiber and 1 is the length of the PM fiber and the additional delay L is added to the light polarized along the slow axis of the PM fiber in this example. After passing the 45 degree aligned polarizer (220), these two sequences of wave packets with the additional delay L are mixed together with the same polarization state defined by the polarizer (220). An optical interferometer 230 is provided downstream from the polarizer (22) to produce a serial of interference signals at delays between $\Delta n^*1$ and $(L-\Delta n^*1)$, these interference signals only correspond the real signals caused by polarization coupling at coupling locations and ghosts peaks are suppressed or eliminated. A processing device 240 is provided to receive the output of the optical interferometer 230 and processes the data in the output to generate the measurements for the locations of coupling points in the PM fiber and the magnitudes of the coupling at the respective coupling points.

Consider a situation where there are three coupling points x1, x2 and x3 along the PM fiber and the light input to the PM fiber has no fast axis component and is polarized along the slow axis of the PM fiber. At each coupling point, light is coupled not only from the polarization mode along the slow axis to the polarization mode along the fast axis, but also from the polarization mode along the fast axis to the polarization mode along the slow axis. As a result of this coupling, the resulted wave packet series output by the PM fiber include wave packets caused by multiple couplings.

After passing through the 45° oriented analyzer, the wave packets aligned to the slow and fast axes will be mixed together. If this mixed light is input to an interferometer, a series of interference peaks can be observed as the delay in one arm of the interferometer is changed. Generated interference peaks represent both actual coupling points in the PM fiber and ghost peaks which do not correspond to actual coupling points in the PM fiber and thus can undesirably cause errors in identification of the actual coupling points. Ghost peaks can also be superimposed on the real peaks, reducing the crosstalk measurement accuracy.

In order to suppress the number and magnitude of the undesired ghost peaks, the delay device 210 in FIG. 2 can be inserted between the PM fiber's output and the polarizer's input. This delay device is polarization selective and can add an additional delay between the slow axis and the fast axis of the PM fiber. Thus, the two wave packet sequences from the fast-axis and slow-axis are separated in time after the light passes through the analyzer. If we preset the same delay offset between the fixed and moving arms in the interferometer, the zero order, second order and most higher order interference signals will not be generated as the delay line scans; therefore, most of the ghost peaks disappear during measurement. Consequently, the device in FIG. 2 has higher position measurement accuracy, higher dynamic range and higher sensitivity than other interferometer-based devices such as the device in FIG. 1.

The polarization-selective optical delay device (210) in FIG. 2 can be implemented in various configurations and can be selected based on the needs of a particular application for the device (210) in FIG. 2. Light in the two polarization modes of the PM fiber can be separated into two optical signals along two separate paths by using a polarization beam splitter and a variable optical delay mechanism can be used to cause a variable optical delay between the two separated optical signals before recombining the two separated signals into a combined optical signal for subsequent processing by the downstream linear optical polarizer and the optical interferometer. These examples can be configured as fixed optical delay devices that produce a desired optical delay $\Delta L(>\Delta n^*1$ where 1 is the length of PM fiber under test) or a variable delay that can be controlled to be at the above desired optical delay $\Delta L$. The ghost peaks can be suppressed by using the proper delay as shown in FIG. 2 as described in U.S. Patent Publication No. US 2011/0277552 A1 under U.S. patent application Ser. No. 12/780,593 entitled "Measuring distributed polarization crosstalk in polarization maintaining bier and optical birefringent material" and filed on May 14, 2010, which is incorporated by reference as part of the disclosure of this document.

Space-resolved polarization cross-talk measurements along a polarization maintaining (PM) fiber have various applications, including distributed stress sensing, fiber gym coil inspection, PM fiber birefringence and beat length measurement, polarization cross-talk location identification in a PM fiber interferometer system, and PM fiber quality inspection. Scanning Michelson white light interferometers can be used to obtain such distributed polarization cross-talk measurements. Unfortunately, as the length of the fiber under test (FUT) increases, the measured cross-talk peaks will be broadened due to birefringence dispersion, resulting in reduced spatial resolution and degraded cross-talk measurement accuracies for PM fibers with a length exceeding certain lengths, e.g., a few hundred meters.

The techniques provided here can be used for improving the resolution and accuracy of distributed polarization cross-talk measurements in a polarization maintaining (PM) fiber against its birefringence dispersion. In some implementations, the broadening of measured polarization cross-talk peaks caused by birefringence dispersion can be restored by simply multiplying the measurement data with a compensation function. The birefringence dispersion variable in the function can be obtained by finding the widths of measured cross-talk envelops at known distances along the fiber. This technique can effectively improve spatial resolution and amplitude accuracy of the space-resolved polarization cross-talk measurements of long PM fibers.

Figure 3:
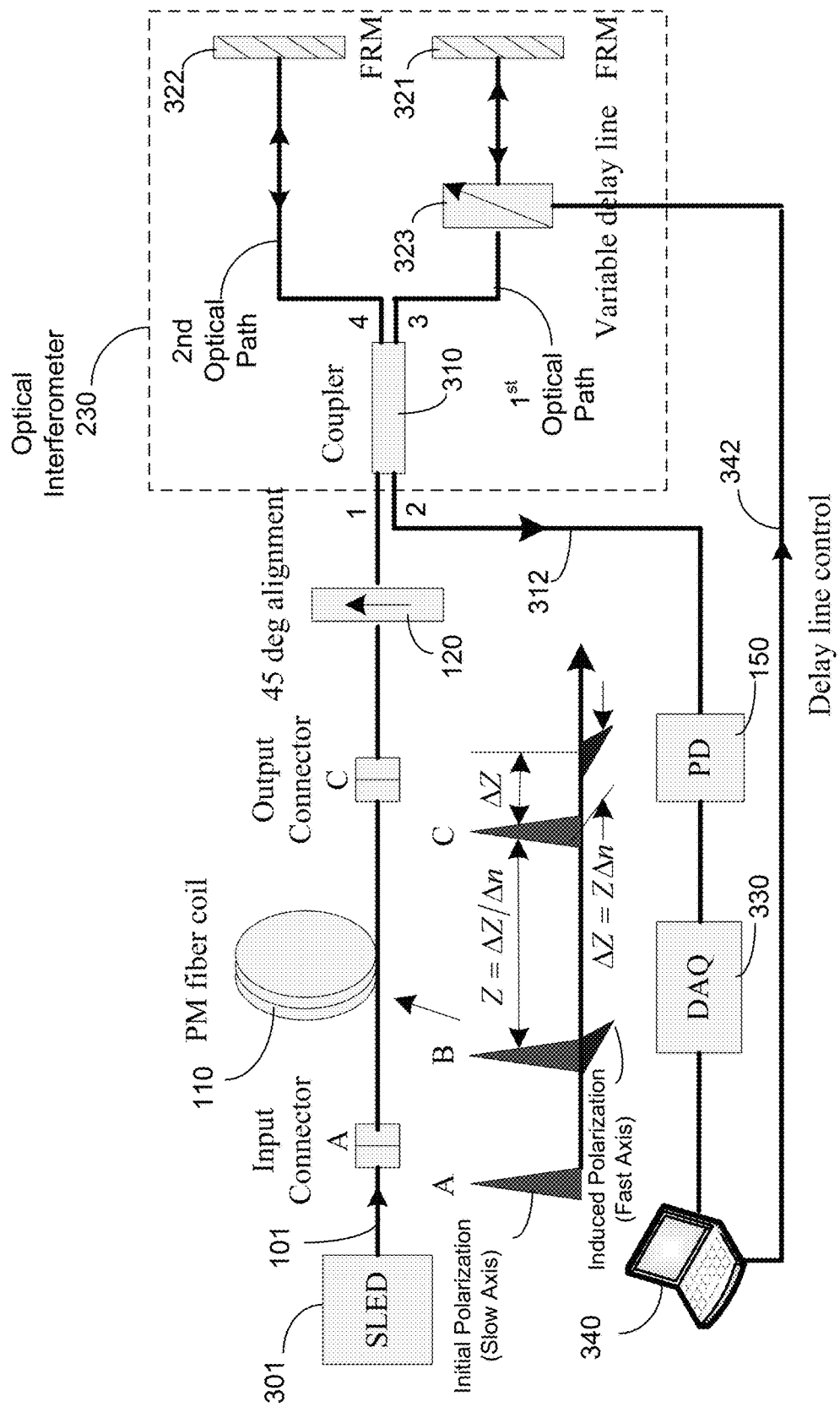
FIG. 3 shows an example device for measuring polarization crosstalk in an optical birefringent medium based on applying a birefringent dispersion compensation function.

In the following sections, implementations details are provided for mathematically compensating the birefringence dispersion in polarization cross-talk measurements of a PM fiber to improve the spatial resolution and measurement accuracy. An example of the compensation function is derived to demonstrate that the effect of birefringence dispersion on polarization-cross-talk measurements can be compensated mathematically. An exemplary white light interferometer based distributed polarization cross-talk analyzer is described. This device was used to measure the initial space-resolved polarization cross-talk peaks along the PM fiber and the spectral widths of the cross-talk peaks as a function of their location along the fiber to obtain the birefringence dispersion $\Delta D$ for the dispersion compensation function. In addition, numerical multiplication of the compensation function with the original measured cross-talk data is performed to eliminate the dispersion induced broadening of the cross-talk peaks. Experiments conducted with a PM fiber coil of 1.05 km length demonstrates that the method is effective in improving the spatial resolution and cross-talk measurement accuracy and can be readily incorporated in the analysis software. The described technology can be used in various applications, e.g., obtaining accurate polarization cross-talk measurements of PM fiber coils with lengths of longer than a few hundred meters and can be used to use the externally triggered crosstalk and the measurements of such crosstalk for various measurements and sensing applications FIG. 3 shows an example of a device for measuring a PM fiber coil. This device can function as a distributed polarization crosstalk analyzer. A polarized broadband light source 301 is coupled into one of the principal polarization axes of an optical birefringent medium 110. Such a polarized broadband light source 301 can be implemented in various configurations, such as a combination of a broadband light source and an optical polarizer. In the example in FIG. 3, the polarized broadband light source 301 is shown as a polarized super luminescent diode source (SLED) with a short coherence length. The polarized output light 101 is directed to be aligned with the slow axis of a PM fiber 110 at point A which is an input fiber connector for connecting the PM fiber coil 110. The PM fiber coil 110 terminates at the output connecter C to output light to an optical linear polarizer 120 which is oriented at an angle with respect to the two principal polarization axes of the PM fiber coil 110, e.g., at 45 degrees. Referring to FIG. 1B, the polarizer 120 transmits part of the light output from the PM fiber coil 110 and mixes the two orthogonal polarizations together.

The PM fiber coil 110 is an optical birefringent medium that supports two orthogonal polarization modes along the PM fiber slow and fast principal axes and the input polarization of the light 101 is aligned with one of the principal polarization axes at the input point A, e.g., the slow axis. The optical output signal out of the optical birefringent medium 110 is directed to the optical interferometer 230 to obtain optical interference of light between the two orthogonal polarization modes. The optical interferometer 230 produces an optical interference signal 312. A photodetector 150 is used to convert the signal 312 into a detector signal that carries the optical interference information. A data acquisition device or card (DAQ) 330 is used to covert the detector signal into data and a processor 340, e.g., a microprocessor or computer, is used to receive the data and processes the obtained optical interference to obtain an envelope spectral function of a polarization crosstalk between the two orthogonal polarization modes in the optical birefringent medium 110. Notably, the processor 340 is programmed to apply a compensation function based on measurements of the optical birefringent medium 110 to the envelope spectral function to reduce a spectral broadening in the envelope spectral function caused by optical birefringent dispersion in the optical birefringent medium 110.

The optical interferometer 230 in FIG. 3 is a fiber-based optical interferometer that includes a fiber coupler 310 with four fiber ports: port 1 as the interferometer input for receiving light from the polarizer 120, port 2 as the interferometer output port for sending out the signal 312, port 3 for connecting to a first optical path of the interferometer 230 and port 4 for connecting to a second optical path of the interferometer 230. The fiber coupler 310 splits the input light into a first beam to the port 3 and the first optical path and a second beam to the port 4 and the second optical path. The first optical path includes a fiber which terminates at a first Faraday mirror 321 which rotates polarization of light by 45 degrees in one pass and thus produces a 90-degree rotation in the polarization of the reflected light. Similarly, the second optical path includes a fiber which terminates at a second Faraday mirror 321 which produces a 90-degree rotation in the polarization of the reflected light. The reflected light beams from both the first and second optical paths are then mixed at the fiber coupler 310 to cause interference based on the optical path length difference between the first and second optical paths. This is a Michelson interferometer. A variable delay mechanism is provided to control the relative delay between the two paths. For example, a variable delay element 323 is placed in the first optical path in FIG. 3 to adjust and control the relative delay in response to a delay control signal 342 from the processor which further operates as a control device. In operation, the variable delay element 323 is scanned to operate the interferometer 230 as a scanning Michelson interferometer.

Consider an example in FIG. 3 where, at point B in the PM fiber coil 110, a polarization cross talk is induced by an external disturbance and some light is coupled from the initial input polarization at point A along the slow axis of the PM fiber coile 110 into the fast axis of the PM fiber 110 with a coupling coefficient parameter represented by the intensity or power ratio between the two polarizations $h=I_1/I_2$, where $I_1$ and $I_2$ are the powers in the fast and slow axes of the PM fiber 110, respectively. Because light polarized along the fast axis travels faster than that along the slow axis, at the output point C of the fiber 110, the faster component is ahead of the slow component by $\Delta nz$, where $\Delta n$ is the group birefringence of the PM fiber 110 and Z is the fiber length between the cross-talk point B and the fiber end at point C. The polarizer 120 oriented at 45° to the slow axis placed at the output of the fiber projects both polarization components onto the same direction to cause interference between the two components in a scanning Michelson interferometer 230. When the relative optical path length is scanned, an interference peak appears when the polarization components overlap in space and disappears when they are separated more than the coherence length of the light source 301. The location B where the cross-talk occurs can be calculated from $z=\Delta z/\Delta n$ and cross-talk amplitude h can be obtained from the interference signal amplitude. FIG. 3 shows a train of the signals at three locations A, B and C in the PM fiber coil 110 illustrating polarization components along the slow axis and the fast axis.

The envelope of a measured cross-talk peak (the interference peak) is influenced by the spectral distribution of the light source 301 and the birefringence dispersion $\Delta D$ of the PM fiber 110. Assume that the SLED 301 has a Gaussian spectral shape, the cross-talk envelope (the degree of coherence) γ can be derived as the function of birefringence dispersive $\Delta D$ and the distance Z of cross-talk point measured from the output:

$$|\gamma(Z, \Delta D)| = \frac{\sqrt{h-h^2}}{(1+\rho^2)^{1/4}} \exp\left\{-\left[\frac{2\delta d}{(1+\rho^2)^{1/2} W_0}\right]^2\right\} \quad (10)$$

where $$\delta d = (\Delta nZ - d) \quad (11)$$

$$\rho = 2\pi c(\Delta\lambda/\lambda_0)^2 \Delta DZ = \alpha \Delta DZ \quad (12)$$

$$\Delta D = d\tau/d\lambda = -[\omega^2/2\pi c](d^2\Delta\beta/d\omega^2)_0 \quad (13)$$

In the equations above, d is the path length imbalance of the scanned Michelson interferometer, ρ is the accumulated birefringence dispersion along the fiber, c is the speed of light in free space, $\Delta\lambda$ and $\lambda_0$ are the spectral width and center wavelength of the light source, $\Delta\beta$ is the propagation constant difference of two polarization eigenmodes, $W_0$ is the 1/e width of the interference envelope when the dispersion ρ is zero. This width is also the coherence length of the light source. Based on Eq. (11), the parameter δd can be adjusted by varying the path length difference d of the delay line in the interferometer. The interference signal appears when the path length imbalance d compensates for optical path length difference $\Delta nz$ between two polarization modes. Eq.(11) to Eq. (13) indicate that both the magnitude and the shape of the measured cross-talk envelope are functions of $\Delta D$ and Z. The degrading effects of birefringence dispersion ΔD on a cross-talk measurement are the reduction of the cross-talk envelope's amplitude and the broadening its shape as Z increases.

Notably, the effects of birefringence dispersion can be directly removed by multiplying the cross-talk measurement data with a dispersion compensation function K(ρ):

$$K(\rho) = \sqrt[4]{1+\rho^2} \exp\left\{-\left[\frac{2\delta d\rho}{(1+\rho^2)^{1/2} W_0}\right]^2\right\} \quad (14)$$

Therefore, the original cross-talk envelope can be completely restored by simply multiply Eq. (14) with Eq. (10):

$$\gamma(Z, \Delta D) \cdot K(\rho) = \sqrt{h-h^2} \exp\left[-\left(\frac{2\delta d}{W_0}\right)^2\right] \quad (15)$$

In order to complete the compensation function, the birefringence dispersion ΔD or ρ must be obtained first. From Eq. (10) one yields the relation between envelop broadening and birefringence dispersion as:

$$W/W_o = (1+\rho^2)^{1/2} = (1+(\alpha\Delta D)^2 Z^2)^{1/2} \quad (16)$$

Therefore, in principle the birefringence dispersion ΔD can be readily calculated by measuring the widths of cross-talk envelops at input (Z=L) and output (Z=0) ends of the PM fiber. In practice, in order to increase the accuracy of ΔD, widths of cross-talk envelops at multiple locations along the PM fiber are measured and ΔD is obtained by curve-fitting to Eq. (16).

Figure 4:
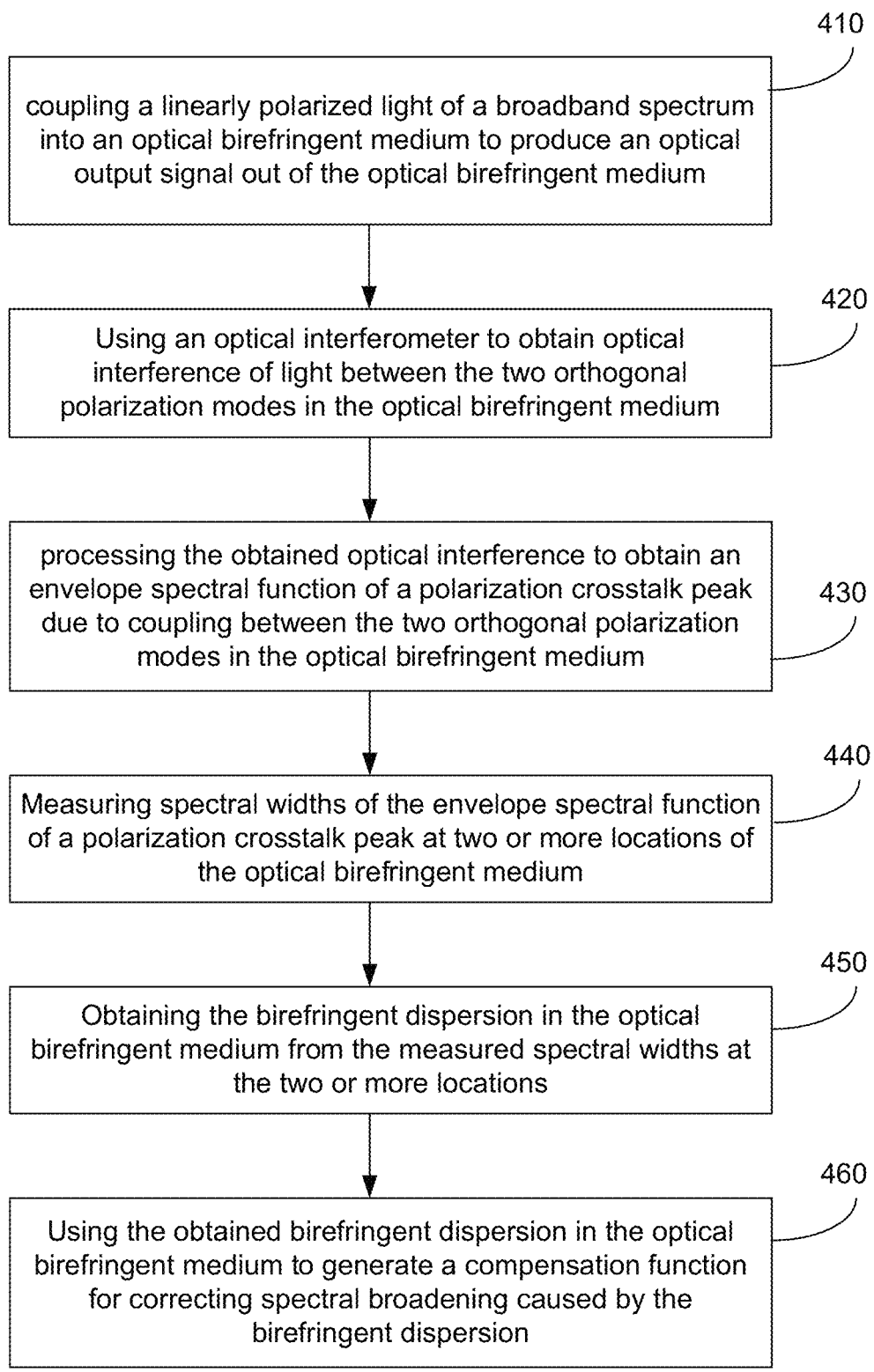
FIG. 4 shows an example of a process for obtaining the birefringent dispersion compensation function based on measuring spectral widths of the envelope spectral function of a polarization crosstalk peak at two or more locations of the optical birefringent medium.
Figure 5:
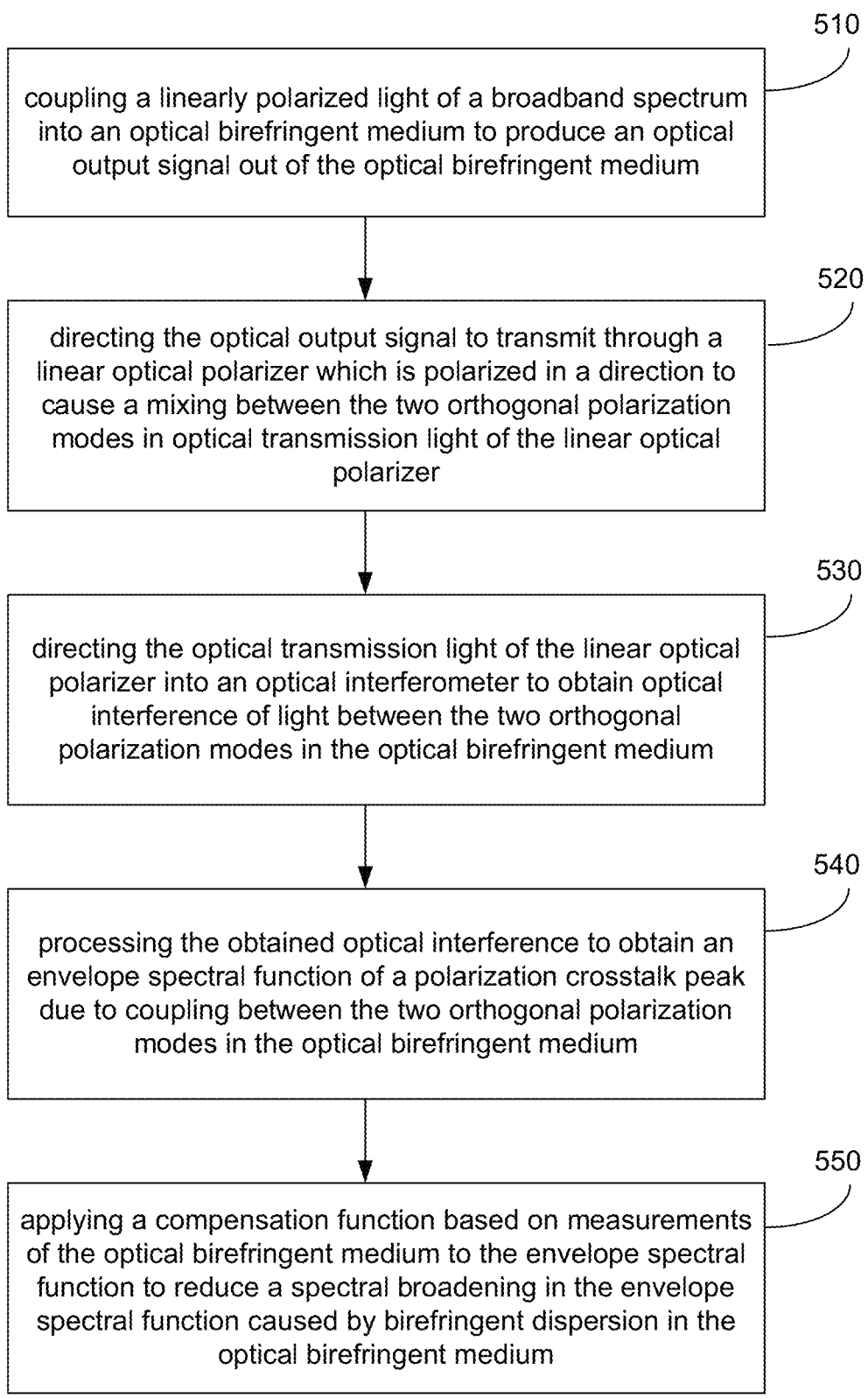
FIG. 5 shows an example of a process for measuring the polarization crosstalk in an optical birefringent medium such as PM fiber based on applying a birefringent dispersion compensation function.

FIGS. 4 and 5 illustrate operational processes of the device in FIG. 3.

FIG. 4 shows an example of a process for obtaining the birefringent dispersion compensation function based on measuring spectral widths of the envelope spectral function of a polarization crosstalk peak at two or more locations of the optical birefringent medium. At 410, a linearly polarized light of a broadband spectrum is coupled into the optical birefringent medium in a direction along which the optical birefringent medium supports two orthogonal polarization modes due to optical birefringence to produce an optical output signal out of the optical birefringent medium. At 420, the optical interferometer is used to process the optical output signal to obtain optical interference of light between the two orthogonal polarization modes in the optical birefringent medium. At 430, the obtained optical interference from the optical interferometer is processed to obtain an envelope spectral function of a polarization crosstalk peak due to coupling between the two orthogonal polarization modes in the optical birefringent medium. At 440, spectral widths of the envelope spectral function of a polarization crosstalk peak are measured at two or more locations of the optical birefringent medium, e.g., the input point A and output point B in FIG. 3. Step 450 is carried out to obtain the birefringent dispersion in the optical birefringent medium from the measured spectral widths at the two or more locations. At step 460, the obtained birefringent dispersion in the optical birefringent medium is used to generate the compensation function for correcting spectral broadening caused by the birefringent dispersion.

Based on the birefringent dispersion compensation function obtained in FIG. 4, FIG. 5 shows an example of a process for measuring the polarization crosstalk in an optical birefringent medium such as PM fiber based on applying the birefringent dispersion compensation function.

Figure 6:
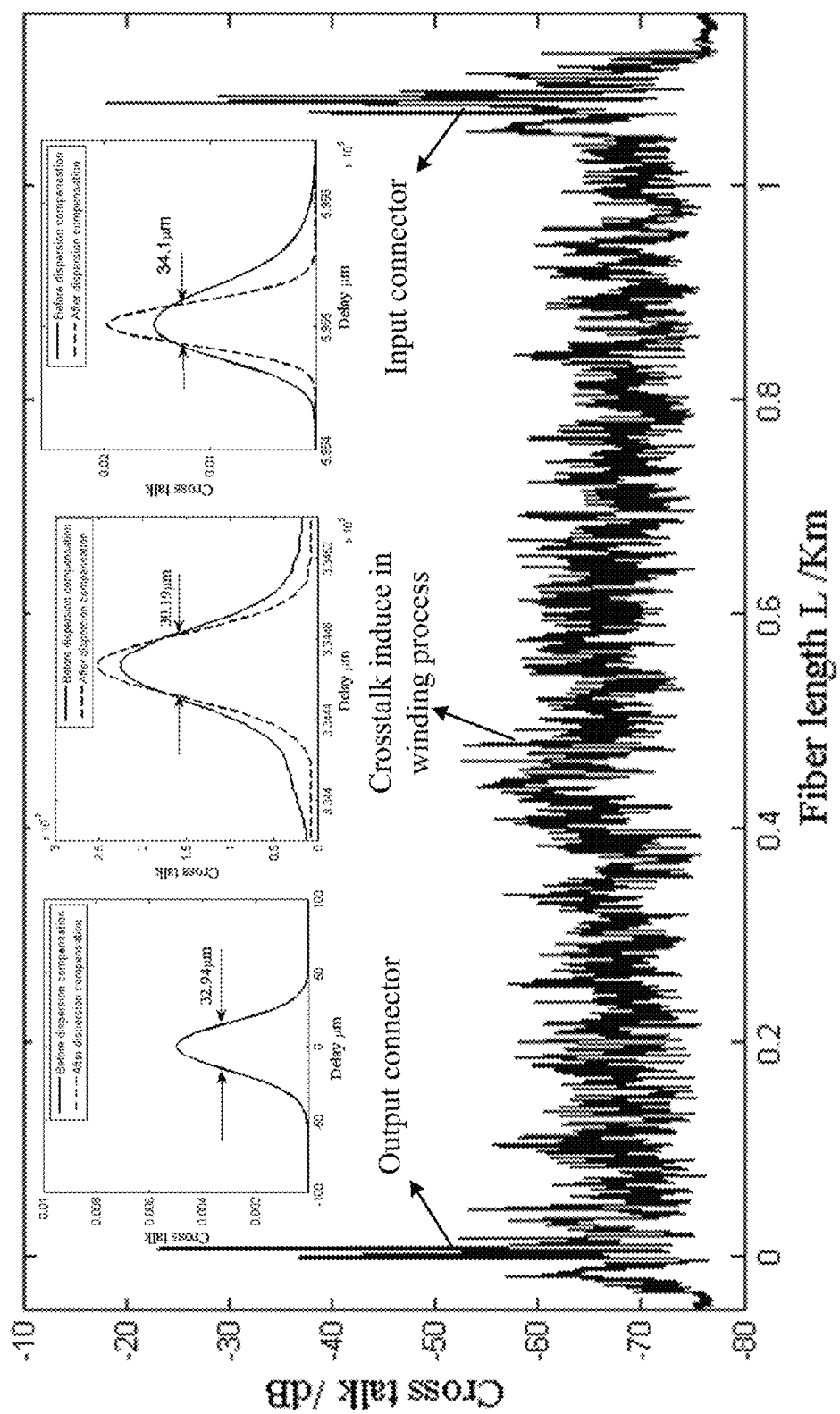
FIG. 6 shows an example of a polarization cross-talk curve of a PM fiber coil. The inserts show both the amplitude and width of cross-talk envelopes at output and input connectors, as well as in the middle region of the fiber before (solid line) and after (dotted line) birefringence dispersion compensation.

FIG. 6 is a measured polarization cross-talk curve of a PM fiber coil based on FIG. 3, showing the effects of birefringence dispersion on the measured cross-talk peaks and how the compensation removes those effects. The peaks at far left and far right correspond to cross-talks induced at output and input connectors A and C from slight fiber axis misalignment. The small peaks in between are the cross-talks induced by stresses during fiber winding process. The solid line in the right insert shows that birefringence dispersion causes two adverse effects: (1) broadening the envelop and (2) diminishing the amplitude of the cross-talk peak occurred at input connector A. The dotted line shows that both the envelop and the amplitude of the cross-talk peak are restored after dispersion compensation is performed. In particular, the envelope width of the peak at input connector is 34.1 μm after dispersion compensation, which is close to 32.4 μm of the left peak induced by the output connector C with zero dispersion (Z=0).

Figure 7A:
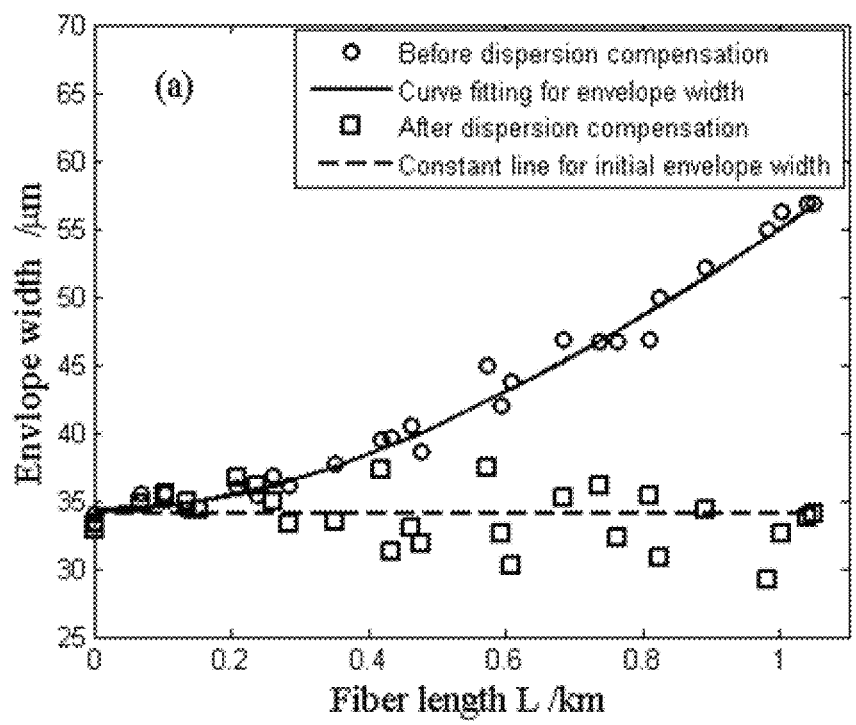
FIG. 7A shows exemplary measurements of the envelop widths of crosstalk peaks induced by stress at various locations PM fiber samples by using the system in FIG. 3.

FIG. 7A shows the measured envelope width as a function of the distance Z. in various tests conducted by using the system shown in FIG. 3. Measurements for multiple polarization cross-talks were performed at different locations along the PM fiber under test. The measurements clearly show that the width increases quadratically with distance Z due to the effect of birefringence dispersion. This behavior is in agreement with Eq. (16). Under the condition of the tests with the PM fiber used, such width broadening due to birefringence dispersion starts to degrade the spatial resolution of polarization cross-talk measurements for distance larger than about two hundred meters.

The birefringence dispersion ΔD of the PM fiber is then accurately obtained by the least-squares fitting the data to Eq. (16) to be 0.0014 ps/(km nm). Substituting the fitting obtained values of αΔD into Eq. (14), we complete the dispersion compensation function. Multiplication of the dispersion compensation function with the original measured cross-talk data produces a modified cross talk data where the dependence of polarization cross-talk on birefringence dispersion ΔD is canceled.

Figure 7B:
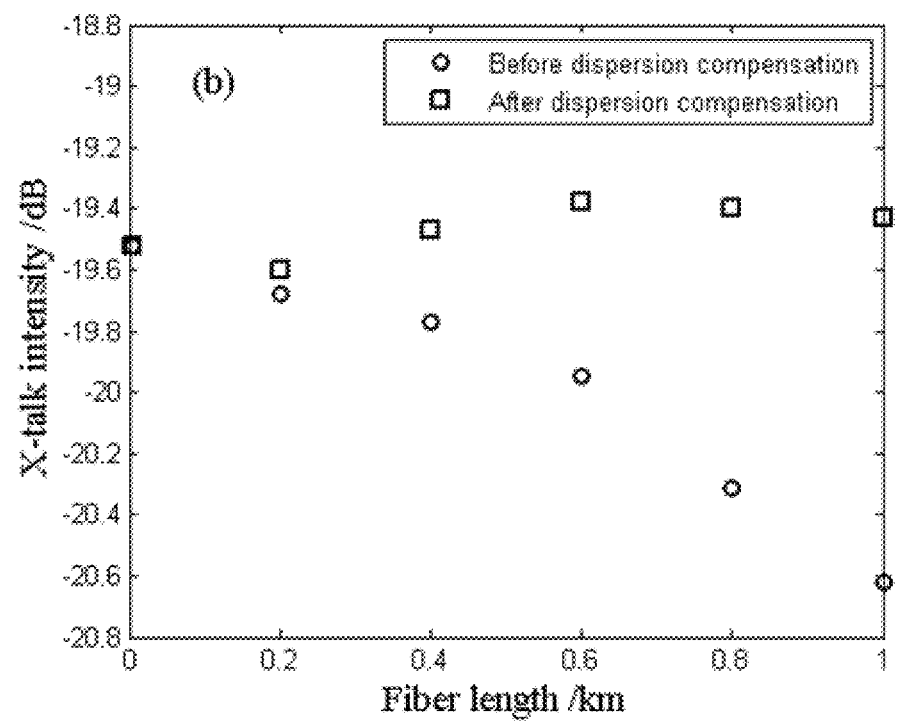
FIG. 7B shows exemplary measured values d crosstalk of the input connector with six different PM fiber lengths.

FIG. 7A shows an example of the envelop width of crosstalk peaks induced by stress at various locations along a PM fiber. The squares in FIG. 7A represent the envelope widths after the width broadenings of the cross-talk peaks are removed from the initial measured envelope widths represented by dots after the dispersion compensation is performed. FIG. 7B shows exemplary measured values d crosstalk of the input connector with six different PM fiber lengths (5 m, 205 m, 405 m, 605 m, 805 m and 1005 m). The crosstalk of the input connector is fixed and five segments of fibers with a length of 200 m each are sequentially spliced to the pigtail of the input connector for increased dispersion. The amplitude of polarization cross-talk decreases with the fiber length Z due to birefringence dispersion and is restored after performing the compensation.

Therefore, the dispersion compensation technique can effectively mitigate the cross-talk amplitude reduction and the line broadening caused by the dispersion. As such, the described compensation technique can be used to effectively improve the spatial resolution and accuracy of cross-talk amplitude measurements using a broadband light source (e.g., a white-light) in optical interferometer based polarization cross-talk analyzers.

Referring back to the example of a sensor device configuration shown in FIG. 3, in one implementation, the polarized super luminescent diode source (SLED) may be configured to have a short coherence length (e.g., around 25 μm) and is coupled into the slow axis of a PM fiber under test (FUT) (point A). The example in FIG. 3 shows that, at another location point B, a polarization crosstalk is induced by an external disturbance which causes some light initially polarized in the slow axis of the PM fiber to be coupled into the fast axis of the PM fiber with a coupling coefficient parameter $h=I_1/I_2$, where $I_1$ and $I_2$ are the light intensities in the fast and slow axes of the PM fiber, respectively. Because the polarized lights along the fast axis travel faster than that along the slow axis, at output of the fiber the faster light component will be ahead of the slow component by $\Delta z = \Delta nz$, where $\Delta z$ is an optical path length difference, $\Delta n$ is a group birefringence of the PM fiber and Z is the fiber length between the point where the crosstalk occurs (B) and the output end (point C). A polarizer oriented at 45° to the slow axis of the PM FUT was placed at the end of the fiber. Polarization components from both slow and fast axes were projected onto a same direction of the linear polarizer axis so as to produce interference pattern between those two components in a scanning Michelson interferometer. When the relative optical path length is scanned, an interference peak appears when these two polarization components are overlapped in the space but disappears when they are separated more than a coherence length of light source (i.e. SLED). Then the location of the crosstalk point B from exit point C can be calculated as $Z=\Delta Z/\Delta n$. If there are multiple polarization crosstalk points beyond the single location B shown in FIG. 3, second order interference peaks will occur because the light in the fast axis caused from the coupling at a crosstalk point will be coupled back to the slow axis at the subsequent crosstalk points down the fiber. Such second order couplings can cause ghost crosstalk peaks and result in confusions in simple white light interferometers. The sensor in FIG. 3 is an example of a ghost-peak-free distributed polarization crosstalk analyzer that uses a differential group delay (Delay Device) inside the device to remove the ghost crosstalk peaks from the second order couplings, making it possible to accurately identify and measure a large numbers of polarization crosstalks along a PM fiber without ambiguity. Some aspects of this ghost-peak-free sensing operation are explained in U.S. Pat. No. 8,599,385 and U.S. Patent Application Publication No. US2013/0321818 A1 of U.S. patent application Ser. No. 13/482,813.

Based on the features described above, the PM fiber can be embedded inside the sensor substrate as the stress sensing element and a strain field over the sensor can cause the polarization crosstalk in the PM fiber. The crosstalk change in the PM fiber can be used as an indicator that reflects a change in the external stress/strain that is exerted on the PM fiber. The polarization crosstalk in a PM fiber tends to be mostly sensitive to transversal stress exerted on the PM fiber, and, by comparison, is much less sensitive to the axial strain or stress. Therefore, the sensor in FIG. 3 can be used to measure the transversal stress and strain. However, in many applications, such as in structural monitoring, the parameters to be monitored are associated with the axial strain or stress. The sensing techniques and devices disclosed below are configured to convert the axial strain or stress into a transversal stress onto the PM fiber to enable the device in FIG. 3 and other sensor devices based on the sensing mechanism in FIG. 3 to detect and monitor axial stress or strain distributions to measure axial mechanical parameters. For example, both the transversal pressure and axial strain can be measured with the sensor strips or sheets disclosed in this document.

The sensor examples provided below include two categories of distributed sensors with two specific types for each category. The first category of distributed sensors is a one-dimensional (1D) sensor strip for performing 1D strain measurements along a particular direction; and the second category is a two-dimensional (2D) sensor panel or sheet for performing strain measurements over a structural surface. In developing those sensors, tension tests were conducted to quantify the relationship between crosstalk change of the sensors and applied strain and the results showed a linear positive correlation. Thus the distributed sensors (both in 1D and 2D) based on PM fiber can be applied in measurements and detection of structural integrity of large structures such as large-scale SHM of civil infrastructures.

Examples of 1-dimensional (1D) Distributed Fiber-optic Strain Sensors

Four different embodiments of 1D sensor strips are disclosed as examples. (1) The sensing PM fiber is placed in a groove on a long strip as the sensor substrate or platform with the slow or fast axis of the PM fiber aligned at 45 degrees from the surface normal of the strip. (2) Holes are provided periodically along a strip or elongated structure as the sensor substrate on which the PM fiber is placed to go through the holes for inducing periodic crosstalk peaks with initial amplitudes. Locally stretching or compressing the strip will cause the pressure applied to the PM fiber at the holes to change, resulting in the change in the amplitude of the initial crosstalk peak. (3) Hole pairs are placed periodically along a strip or elongated structure and PM fiber passes by each pair of holes to form initial periodical crosstalk peaks. As the strip is stretched or compressed longitudinally, the pressure exerting on the PM fiber at the holes will vary, causing a change in the amplitude of the crosstalk peak. (4) The PM fiber is tightly embedded with or along a zigzag shaped strip in a sensor strip or substrate so that an initial crosstalk peak can be generated at each bending corner of the zigzag shaped strip. As the strip is stretched or compressed at a particular location, the bending induced pressure on the PM fiber close to that location would change, causing variations in the amount of crosstalk. In implementing the above four 1D sensor designs, various PM fibers can be used.

FIG. 8A shows an example of a sensor strip in a 1D configuration in which the sensing PM fiber is placed in a groove on a long strip as the sensor substrate or platform and the slow or fast axis of the PM fiber is aligned at 45 degrees from the surface normal of the strip. This orientation of the polarization axis of the PM fiber ensures the polarization crosstalk in the PM fiber be sensitive to the change of the applied pressure as a pressure sensor. Basically, the slow or fast axis of the PM fiber is set to be around 45 degrees from the direction of the pressure. One way to achieve this desired PM fiber orientation, the sensor strip in FIG. 8A is configured to have a groove running along its length. The sensor strip can be made with a deformable or elastic material so the sensor strip can deform with a target device to which the sensor strip is engaged. For example, the sensor strip can be a plastic material or a material with a certain desired elasticity including, e.g., Nylon and Delrin materials. For the process of laying the PM fiber on the strip with the proper orientation of its polarization axis (the slow or fast axis), a proper method can be used to identify the slow axis, e.g., using an optical magnifying setup to inspect the PM fiber and observing either the slow or fast axis of the PM fiber prior to laying the fiber into the groove with the correct fiber orientation. FIG. 8C shows an example of the corresponding polarization crosstalk peaks induced at two locations Z1 and Z2 along the sensor strip by a pressure applied to the sensor in FIG. 8A.

FIG. 8B shows another example of a sensor strip in a 1D configuration in which the sensing PM fiber is placed in a groove on a long strip as the sensor substrate or platform where periodic structures such as bumps or trenches across the sensor strip are fabricated along the groove, e.g., about every 10 cm along the strip, as fixed locations along the fiber for applying pressure or strain on the PM fiber for inducing predetermined crosstalk peaks at their corresponding locations. FIG. 8D shows an example of the corresponding crosstalk peaks induced by the applied pressure or strain in FIG. 8B. In some implementations, the cross-section of the sensor strip may be 25.4 mm wide and 0.65 mm thick.

In using the 1D sensors in FIGS. 8A and 8B, when installing or taping the sensor strip to a surface to be sensed, the placement of the sensor strip on the surface can be used define the orientation of the PM fiber to make sure it has the most sensitive orientation to the applied pressure. An adhesive can be applied into the groove to affix the fiber and a top layer adhesive can also be applied to cover the fiber and protect from damages. An adhesive tape may be applied to once the fiber is laid into the groove for protection.

FIGS. 9A and 9B show a third example of a sensor strip in a 1D configuration where the sensor strip substrate includes holes to allow the PM fiber to be threaded through the holes to induce predetermined polarization crosstalk peaks. FIG. 9A shows the top view of the sensor illustrating locations of the holes along the PM fiber and FIG. 9B shows the side view of the sensor illustrating that the PM fiber is threaded through the holes to have PM fiber sections to be alternatively on top and bottom opposite sides of the sensor strip substrate. Two adjacent PM fiber sections on opposite sides of the sensor strip substrate are connected by a PM fiber section that passes through a single hole located between the two adjacent PB fiber sections. FIG. 9C shows an example of corresponding polarization crosstalk peaks induced by the holes and external transversal stress (at $Z=Z_1$) and axial strain (at $Z=Z_2$). In the example in FIGS. 9A and 9B, the spacing between the holes in the sensor strip substrate are equally spaced and, in other implementations, the spacing may vary.

In FIGS. 9A and 9B, the sensor has a single hole for each interval of the PM fiber on the sensor strip substrate. In this configuration, the PM fiber from the first side of the sensor strip substrate passes through a first hole to the second side and then goes back to the first side after a distance (e.g., around 10 cm in some implementations) to go back via the next hole in the sensor strip substrate. The fiber bending occurs when the fiber passing through each hole creates a predetermined amount of polarization crosstalk at the location of the hole. Fiber guiding grooves can be made on both sides of the sensor strip substrate to hide the fibers in the groove and adhesives or tapes can be used to cover the fiber in the groove. An important feature of this sensor design is the sensor is sensitive to the local axial strain applied to the sensor strip, as shown in FIGS. 9A and 9C because the sensor can convert the axial strain into transversal stress to induce the polarization crosstalk. Likewise, when an axial compressive tension is applied to the section of the strip, a decreased polarization crosstalk will appear at the location of the fiber bend. This sensor is still sensitive to the transversal pressure applied to the strip, as in the first two sensor designs in FIGS. 8A and 8B.

FIGS. 10A and 10B show the top view and side view of a sensor strip device having multiple pairs of holes for holding the PM fiber with one pair of holes per sensing PM section in a 1D configuration. In one implementation, the multiple pairs of holes are formed as through holes in the sensor strip substrate (e.g., by drilling or other methods), and the bare PM fiber passes up and down through each pair of two holes to initialize crosstalk, as shown in FIG. 10B. The spacing between two adjacent holes in a hole pair is small while two adjacent pairs of holes is much greater as shown so that the PM fiber sections in FIGS. 10A and 10B are primarily on one side of the sensor strip substrate while having only small PM fiber portions on the opposite side at in the space between two adjacent holes of each hole pair. This is different from FIGS. 9A and 9B where the PM sections are alternatively placed on the two opposite sides of the sensor strip substrate. The materials of the sensor substrate may be deformable or elastic materials such as Nylon and Delrin materials or any other types of material with certain elasticity.

In some implementations, the cross-section of the sensor strip may be 25.4 mm wide and 0.65 mm thick. For example, the holes with a desired diameter (e.g., 300 micrometer) may be drilled through the substrate with an inclined angle with respect to the sensor substrate, e.g., 45 degrees or other angles. A pair of closely spaced holes (e.g., 1 mm to 1 cm spacing in some implementations) are created to allow the PM fiber from the first side of the strip to go to the second side through the first hole and then come back to the first side through the second hole, as shown in FIG. 10B. The fiber bending occurs at the location where the PM fiber goes through the two holes, which will create an initial polarization crosstalk. The spacing between two adjacent pairs of holes is set at a desired space, e.g., a 10 cm interval. A groove can be formed or carved on the substrate between pairs of holes to guide the PM fiber from one pair to another. As a specific example, choosing the 10 cm interval is in consideration of the 6 cm spatial resolution of the DPXA interrogator. Other intervals can be chosen for different applications. A layer of an adhesive tape or adhesive can be attached to the surface of the strip to cover the fiber and protect it from potential damages.

FIG. 11 shows a sensor strip with a zigzag fiber path for sensing. In this design, a zigzag path is formed in the sensor strip substrate and the bare PM fiber is embedded with or placed in the zigzag path. The sensor substrate materials can be Nylon, Delrin, or any other material with certain elasticity and certain mechanical properties, e.g. Young's modulus. An exemplary cross-section of the sensor strip is 25.4 mm wide and 0.65 mm thick. The bending of the PM fiber around the corner of the zigzag path can cause polarization crosstalk at the corners of the bends, creating a series polarization crosstalk peaks of certain magnitudes. When an axial stretching strain is applied to a section of the strip, the tension is generated along the fiber and increases the stress on the corner of the PM fiber around the fiber bend, resulting in an increase in the polarization crosstalk. Likewise, when an axial compressive tension is applied to the section of the strip, a decreased polarization crosstalk will appear at the location of the fiber bend.

In one implementation of the sensor design in FIG. 11, a groove can be carved on one side of the strip, with a width and depth comparable to the fiber diameter, for example with a width of 300 microns and a depth of 300 microns for a PM fiber with a diameter of 250 microns. The groove is carved in a zigzag shape and changed direction after every 10 cm distance interval (or other numbers). A thin layer of silicon adhesive or other types of coating can be applied along the groove to guide the direction of bare fiber. Immediately after the first layer of silicon glue is applied, bare PM fiber is embedded into the groove with pretension to make it straight. A second layer of glue is later applied to cover the fiber afterwards and adhesive tapes can be further to assure a good bonding of the glued fiber to the sensor strip. Special attention should be paid to the transition corners, where initial crosstalk peaks would occur and change significantly under applied local strain, so that the fiber don't come out due to micro bending at the corner. After the glue is cured, previous adhesive tapes are removed and another layer of adhesive tapes can be applied to cover the whole sensor surface for protection purpose. When laying the PM fiber in the groove, the slow or fast axis of the PM fiber can oriented 45 degrees from the surface normal of the strip to provide the maximum measurement sensitivity.

In operation, when the strip is stretched longitudinally along the strip at certain locations, a pressure is exerted on the PM fiber at the corresponding corners, increasing the amount of polarization crosstalk initially generated by the corners. Likewise, when the strip is compressed longitudinally, the crosstalk at the corner affected by the compression can be reduced. The strip can be pre-calibrated with a known applied weight/strain so that the amount of crosstalk increase or decrease can be related to certain strain applied. Therefore, by measuring the polarization crosstalk changes, the local strains applied on the strip can be measured. When the strip is affixed to a structure, such as a bridge, any local strains will be transferred to the strip to affect the polarization crosstalk at the locations of the strain.

Examples of 2-dimensional (2D) Distributed Fiber-optic Strain Sensors

The sensing mechanism for the above 1D sensor strips can be extended to the 2D sensor panels where PM fiber sections are arranged in a two dimensional array or matrix. Five examples of 2D sensor panels are disclosed: (1) 2D stress sensing panel/sheet without predetermined crosstalk marks; (2) 2D stress sensing panel/sheet with bumps or trenches for inducing predetermined polarization crosstalk marks; (3) 2D transversal stress and horizontal strain sensing panel/sheet with predetermined crosstalk inducing holes; (4) 2D sensing panel with PM fiber embedded with zigzag routes; and (5) 2D sensor panel/sheet with PM fiber embedded with triangle shape on both sides of the sensor panel and their orientations are perpendicular to each other.

FIGS. 12A and 12B show an example of a 2D pressure sensor panel without polarization crosstalk marks. In this example, the fiber PM fiber is routed on a plane panel or sheet in a pattern shown in FIG. 12A. The sensor panel is designed for sensing pressure or transversal stress and the slow or fast axis of the PM fiber is oriented 45 degrees from the surface normal of the panel. The stress can be shown as a function of distance Z, as shown in FIG. 12B. Alternatively the stress/polarization crosstalk information can be shown in a 2D plot as shown in FIG. 12C, with the amount of stress represented by the color. a 3D plot with X, Y and stress/polarization crosstalk as the coordinates. The crosstalk can be calibrated with a known pressure or weight to convert the crosstalk value into pressure or tress value.

FIG. 13A shows an example of a 2D sensor panel with predetermined polarization crosstalk marks. The panel includes multiple bumps or drenches to induce predetermined amount of polarization crosstalk peaks whenever the fiber passing over the bumps or drenches. These pre-loaded polarization crosstalk peaks act as location markers, as shown in FIG. 13B, where the polarization crosstalk is a function of position Z is plotted. The induced polarization crosstalk peaks by external pressure or stress are also shown in FIG. 13B, and can be presented in the XY plot in FIG. 13C. a 3D plot can also be created to show the amount of stress/crosstalk with the 3rd axis. Calibration with known pressure or weights can be performed to convert the crosstalk value into pressure or stress value in the figures.

FIG. 14A shows another example of the sensor panel with holes for inducing predetermined polarization crosstalk marks for measuring transversal stress and horizontal strain on the sensing panel.

Similar to the hole design in the 1D sensor in FIGS. 8A and 8B, the hole design is used in FIG. 14A so that the PM fiber is threaded through the holes to 1) induce predetermined crosstalk peaks, and 2) convert local horizontal strains into vertical stress. In FIG. 14A, the strains in both X (at Z1) and Y (at Z2) directions can induce polarization crosstalks at the places where the local strain is applied. The stress can also induce crosstalk, as shown in FIG. 14A at the location, Z=Z3. FIGS. 14B and 14C show examples of the stress measurements. A 3D plot can also be used to present the data where X and Y represent the positions/locations of the stress/strain and the vertical axis represents the crosstalk/stress value.

Figure 15A:
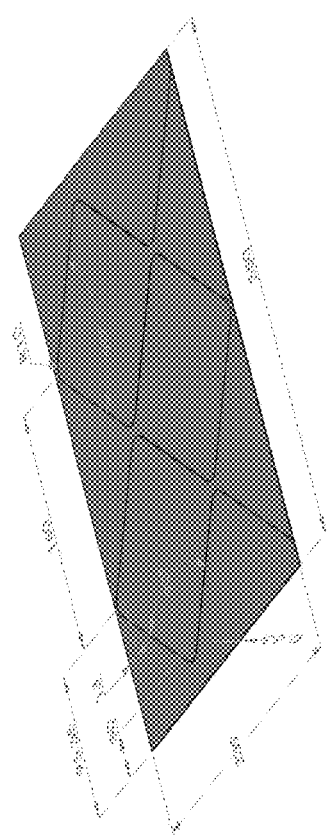
Figure 15B:
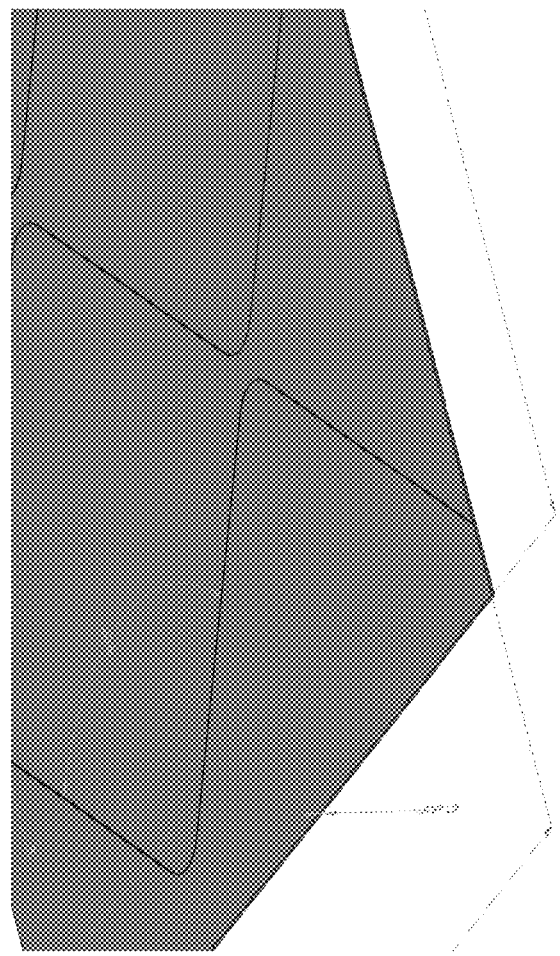

FIGS. 15A and 15B show an example of a 2D PM fiber sensor with zigzag shape PM fiber paths on one side of the sensor panel. In implementations, the sensor panel can be made of a deformable or elastic material, e.g., polystyrene, PVDF and others. For example, the panel may have a thickness of 0.65 mm in some implementations. Similar to the zigzag design in the 1D sensor strip, the sensor in FIGS. 15A and 15B includes zigzag grooves on one side of the panel for holding the PM fibers and may be, 300 micrometer wide and 300 micrometer deep is carved on one side of the panel. The groove may orientated in a 90-degree zigzag shape over the sensor panel. The distance between two corners may be set to 8 cm, for example. The bare PM fiber is guided along the groove with silicon glue. A protective layer of tape can be used to cover the embedded fiber. Such a 2D sensor panel is sensitive to local strain changes and can be used to detect or identify local strain field change in both X and Y directions in the plane of the panel. The measured data can be presented as in FIGS. 14B and 14C, or in 3D format.

Figure 16A:
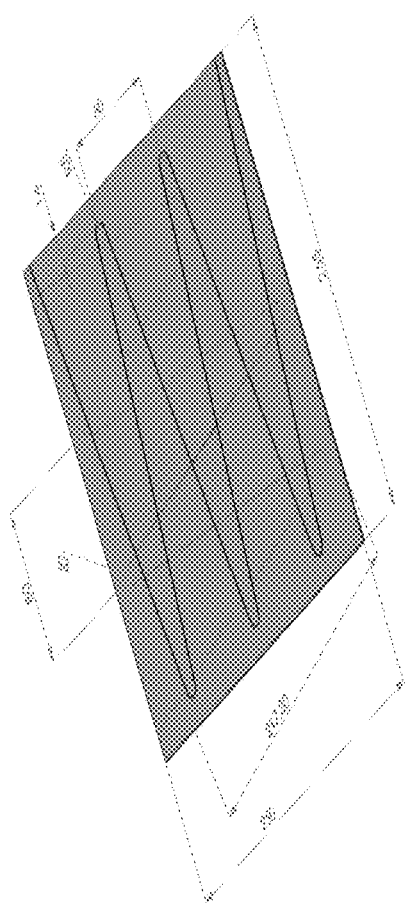
Figure 16B:
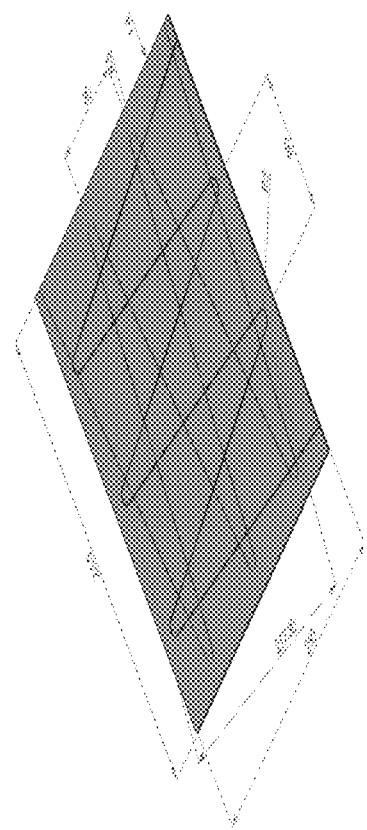

FIG. 16A shows an example of a 2D PM fiber sensor have zigzag fiber paths on two sides of the panel and the PM fiber path on one side at a location is substantially perpendicular to the PM fiber path at the same location on the other side of the pane.

In the illustrated example, the long triangle shape grooves are carved on both sides of the panel, with perpendicular orientation to each other. The bare PM fiber is glued along the groove from one end to the other end on one side of the panel, and turned over to glue on the backside of the panel. The fiber is embedded inside the groove and protected. For example, the width of each big triangle may 8 cm and the height may be 24 cm. Since the orientation (as well as the tip) of the triangles on one side is orthogonal to that of the other side, this type of 2D senor panel is sensitive to changes in the stress or strain on the panel and is capable to identify the orientation of applied strain.

Figure 17:
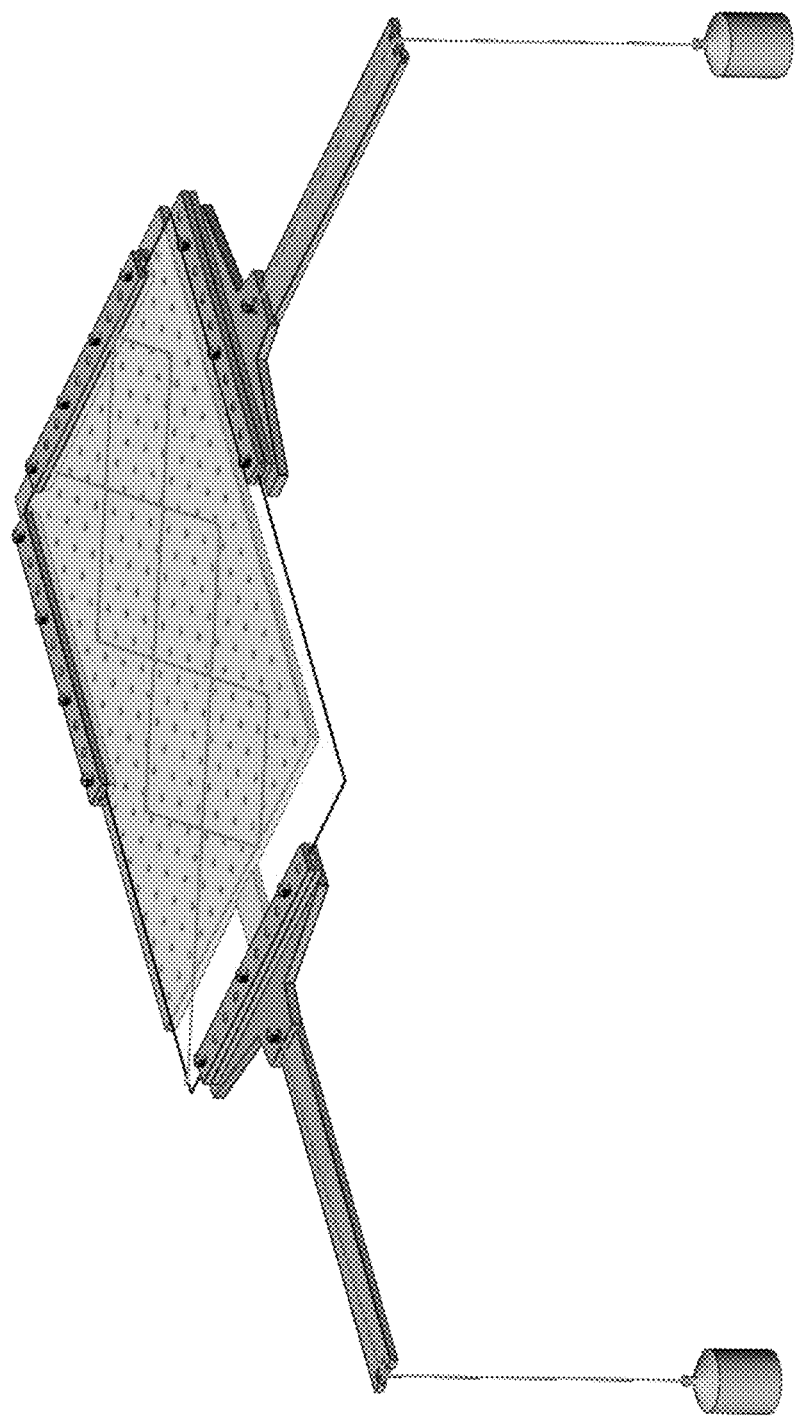
FIGS. 17 and 18 show calibration setup and calibration of a PM fiber sensor.

Measurements are conducted to correlate the crosstalk change with the strain value applied to the 2D sensor panel. FIG. 17 shows an example of a quantitative test setup to allow for applying a tension force in any direction within the sensor plane. In conducted measurements, the tension force was applied through a rope where one end of the rope was connected to the sensor body with a small piece of plate, and the other end was connected to a basket that could hold weights. There was a pulley in between to guide the rope. As a result, the tension force could be calculated with the number of known weights we used.

Assuming strain is uniformly distributed over the whole sensor body, it can then be derived with the following formula: strain=(M*g)/(E*A). M is the weight in kilogram, g is the gravity acceleration (g=9.8 m/s$^2$), E is the material's Young's modulus (E=2.83 GPa in this case), and A is the area of the cross-section (e.g. A=20.828 mm$^2$ for the strip sensor). The weights were added with a 0.5 kg increment, and the corresponding crosstalk was measured by the DPXA after every step.

Figure 18:
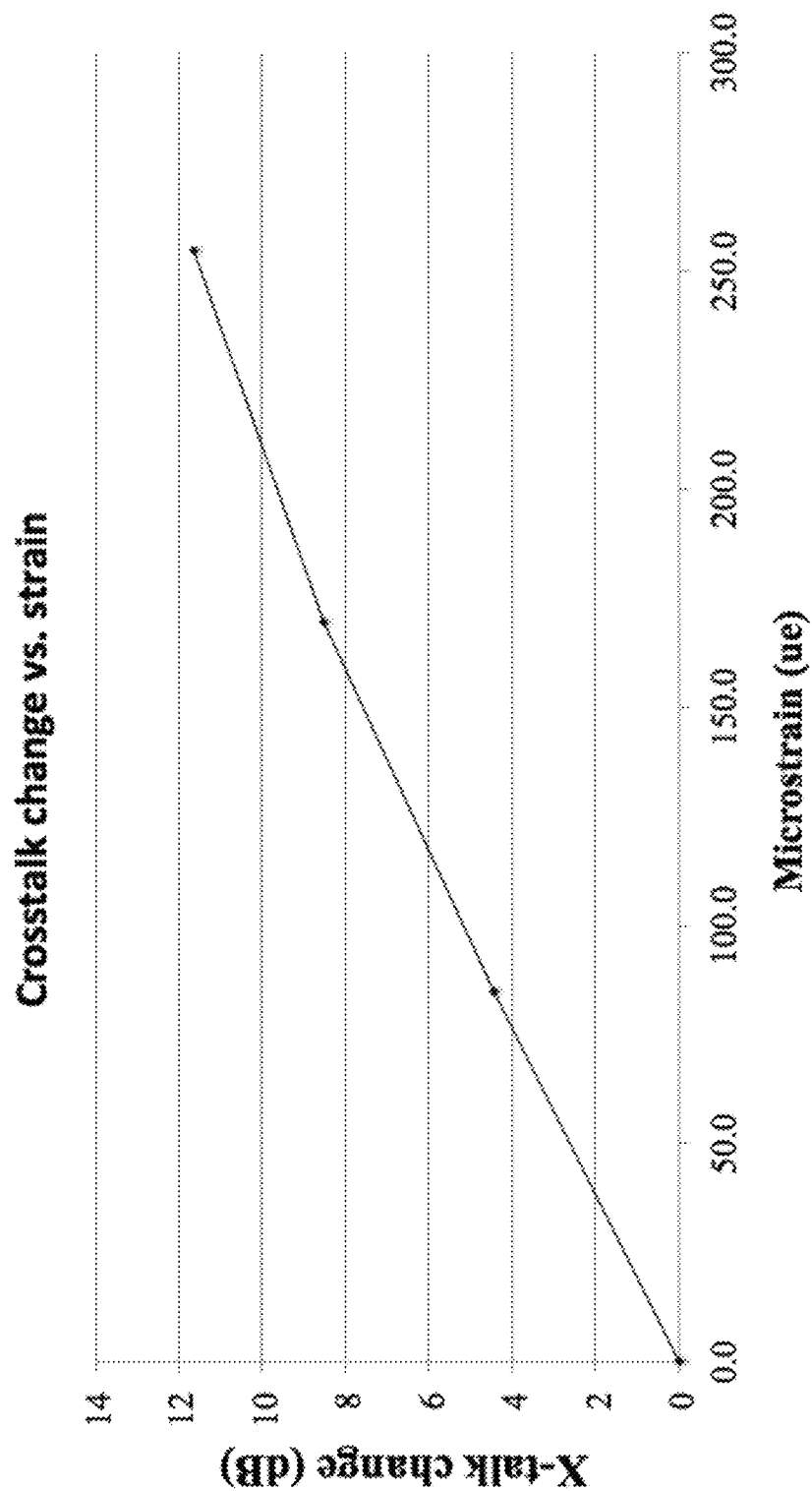

FIG. 18 shows an example for the measured relationship between crosstalk change and applied tension strain. The measurements show that the change of crosstalk has a positively linear relationship with the strain value in the sensor. This relationship enable measuring strain from the crosstalk change in the PM sensors. Therefore, with the DPXA as an interrogator, the novel distributed 1D sensor strip sensors and 2D sensor panels can be used in various applications, including in large-scale structural health monitoring of civil infrastructure. The disclosed PM fiber sensors can be configured to provide distributed 1D and 2D measurements, to cover large monitoring area of structures and provide highly precise measurements r with a high spatial resolution (e.g., around 6 cm).

While this document contains many specific implementation details, these should not be construed as limitations on the scope of the invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the embodiments described above should not be understood as requiring such separation in all embodiments.

Thus, particular implementations are disclosed. Variations, modifications and enhancements of the disclosed implementations and other implementations can be made based on what is described and illustrated in this document.

What is claimed is:

1. An optical fiber sensor device, comprising:
   a sensor plate formed of a deformable or elastic material and structured to include a 1-dimensional array of holes that are at different locations and penetrate through the sensor plate;
   a length of polarization maintaining (PM) fiber as a sensing element and engaged to the sensor plate by sequentially passing through the holes at multiple engaging locations on the sensor plate so that different sections of the PM fiber are alternatively on opposite sides of the sensor plate and two adjacent PM fiber sections are on opposite sides of the sensor plate to form sensing locations;
   an optical light source that produces probe light and is coupled to the PM fiber to deliver the probe light into the PM fiber; and
   a detector module coupled to receive probe light from the PM fiber and to measure the received probe light to determine a stress exerted on the sensor plate.

2. The device as in claim 1, wherein the PM fiber is engaged to the sensor plate at multiple engaging locations in a linear array on the sensor plate.

3. The device as in claim 1, wherein the detector module includes:
   an optical interferometer located to receive the probe light from the PM fiber and structured to obtain optical interference of light between the two orthogonal polarization modes in the received probe light;
   an optical detector to detect the optical interference to produce a detector output that carries information on a distribution of stress or strain exerted on the sensor plate.

4. The device as in claim 1, wherein:
   the PM fiber is engaged to the sensor plate to form a zigzag pattern.

5. The device as in claim 1, wherein the sensor plate include bumps or trenches in contact with the PM fiber as the engaging locations.

6. The device as in claim 1, wherein the sensor plate is affixed on an object for sensing the space-resolved strain on the object.

7. The device as in claim 1, wherein the holes are equally spaced.

8. The device as in claim 1, wherein a spacing between two adjacent holes varies along the 1-dimensional array of holes.

* * * * *